United States Patent
Kim et al.

(10) Patent No.: US 10,908,705 B2
(45) Date of Patent: Feb. 2, 2021

(54) ELECTRONIC DEVICE AND CONTROLLING METHOD THEREFOR

(71) Applicant: LG ELECTRONICS INC., Seoul (KR)

(72) Inventors: Sumi Kim, Seoul (KR); Kyoungduck Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 15/739,403

(22) PCT Filed: Aug. 5, 2015

(86) PCT No.: PCT/KR2015/008201
§ 371 (c)(1),
(2) Date: Dec. 22, 2017

(87) PCT Pub. No.: WO2016/208804
PCT Pub. Date: Dec. 29, 2016

(65) Prior Publication Data
US 2018/0188835 A1 Jul. 5, 2018

(30) Foreign Application Priority Data
Jun. 25, 2015 (KR) .......... 10-2015-0090384

(51) Int. Cl.
| G06F 3/0354 | (2013.01) |
| G06F 3/0346 | (2013.01) |
| G06F 3/038 | (2013.01) |
| G06F 3/03 | (2006.01) |
| G06K 9/00 | (2006.01) |
| G06K 9/24 | (2006.01) |
| G06F 3/0488 | (2013.01) |
| G06F 3/041 | (2006.01) |

(52) U.S. Cl.
CPC ........ *G06F 3/03545* (2013.01); *G06F 3/0304* (2013.01); *G06F 3/038* (2013.01); *G06F 3/0321* (2013.01); *G06F 3/0346* (2013.01); *G06F 3/041* (2013.01); *G06F 3/04883* (2013.01); *G06K 9/00402* (2013.01); *G06K 9/24* (2013.01)

(58) Field of Classification Search
CPC . G06F 3/03545; G06F 3/04883; G06F 3/0488
USPC ....................................................... 345/179
See application file for complete search history.

(56) References Cited

U.S. PATENT DOCUMENTS 6,422,775 B1 * 7/2002 Bramlett ................ B43K 29/08
382/188
2001/0024193 A1 * 9/2001 Fahraeus ................ G06F 3/0321
345/173
(Continued)

FOREIGN PATENT DOCUMENTS

WO  WO 2013/141999 A1  9/2013

*Primary Examiner* — Koosha Sharifi-Tafreshi
(74) *Attorney, Agent, or Firm* — Birch, Stewart, Kolasch & Birch, LLP

(57) ABSTRACT

An electronic device including a housing including a grip portion; a memory included in the housing; a sensor located in the housing; and a controller configured to operate in a first mode in which content corresponding to a trajectory of a tip of the housing is stored in the memory, and operate in a second mode in which a command corresponding to the trajectory of the tip of the housing executes a specific function on the electronic device.

12 Claims, 34 Drawing Sheets

(56) References Cited

U.S. PATENT DOCUMENTS

| | | | |
|---|---|---|---|
| 2005/0024346 A1* | 2/2005 | Dupraz | G06F 3/03545 345/179 |
| 2009/0273585 A1* | 11/2009 | De Haan | G06F 3/03545 345/179 |
| 2011/0164001 A1* | 7/2011 | Seo | G06F 3/038 345/179 |
| 2014/0055426 A1 | 2/2014 | Park et al. | |
| 2014/0160092 A1 | 6/2014 | Tseng | |
| 2015/0338940 A1* | 11/2015 | Vong | G06F 3/041 345/179 |
| 2017/0322665 A1* | 11/2017 | Shim | G06F 3/0425 |

* cited by examiner

FIG. 13
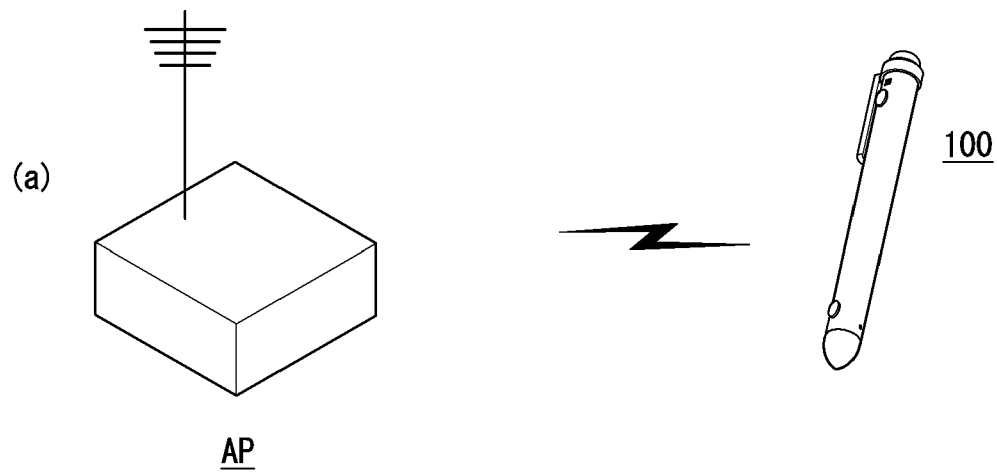
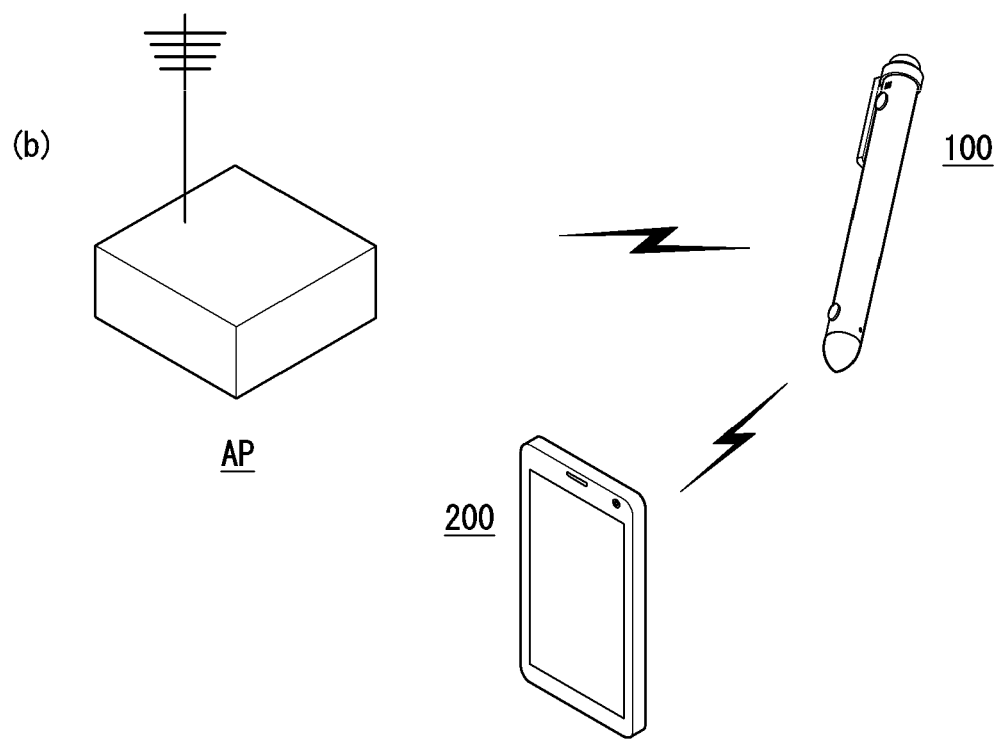

ELECTRONIC DEVICE AND CONTROLLING METHOD THEREFOR

CROSS REFERENCE TO THE RELATED APPLICATIONS

This application is the National Phase of PCT international Application No. PCT/KR2015/008201, filed on Aug. 5, 2015, which claims priority under 35 U.S.C § 119(a) to Patent Application No. 10-2015-0090384, filed in Republic of Korea on Jun. 25, 2015, all of which are hereby expressly incorporated by reference into the present application.

BACKGROUND OF THE INVENTION

Field of the Invention

The present invention relates to an electronic device and a method for controlling the same capable of operating in different modes depending on user manipulation performed thereon.

Related Art

Electronic devices can be divided into a mobile type and a fixed type according to mobility. Mobile electronic devices can be divided into a portable electronic device and a stationary type electronic device according to user portability.

Electronic devices are diversified. For example, electronic devices are divided into conventional types such as a bar type and wearable types which can be used in various situations.

Recently, research on electronic devices taking the forms of existing objects is in progress in order to provide analog sensibility.

SUMMARY OF THE INVENTION

An object of the present invention is to solve the aforementioned problem and other problems. Another object of the present invention is to provide an electronic device and a method for controlling the same capable of operating in different modes depending on user manipulation performed thereon.

According to an aspect of the present invention to accomplish the above objects or other objects, there is provided an electronic device including: a housing providing a grip portion in which a plurality of fingers of one hand of a user is contacted; a memory included in the housing; a sensor located at at least one side of the housing; and a controller configured to operate in any one of a first mode and a second mode based on an operation by a user sensed via the sensor, wherein in the first mode, content is stored in the memory, the content being corresponded to a trajectory according to a motion of one end of the housing, and wherein in the second mode, a specific function is performed, the specific function being preset corresponding to the trajectory.

The controller may switch from the first mode to the second mode when at least one of a preset specific character and symbol is input using the gripped housing.

The specific function may be one of function group including a plurality of functions, wherein the controller may activate a function corresponding to at least one of the specific character and symbol among the plurality of functions included in the function group.

The controller may perform the specific function using additional information input together with at least one of the preset specific character and symbol.

The controller may switch from the first mode to the second mode when at least one of a preset posture or gesture is input using the gripped housing.

The controller may switch the mode when at least one of the posture or the gesture is maintained longer than or equal to preset time.

The controller may activate a first function for performing the specific function and at least one second function related to the first function when the mode is switched to the second mode.

The specific function may include at least one of call function, message transmission/reception function, contact di splay function, alarm function, playback function, recording function, and e-mail transmission/reception function.

The electronic device may further include a tip located at one end of the housing which is a point of contact with other object and leaving the trajectory on the contacted other object.

The controller may selectively activate the tip according to the mode.

The electronic device may further include a wireless communication unit for transmitting the content stored in the memory to at least one other device.

According to another aspect of the present invention, there is provided a method for controlling an electronic device including: acquiring an operation by a user for a housing providing a grip portion in which a plurality of fingers of one hand of a user is contacted; operating in a first mode for storing content being corresponded to a trajectory according to a motion of one end of the housing in a memory; and operating in a second mode for performing a specific function being preset corresponding to the trajectory.

The method may further include switching from the first mode to the second mode when at least one of a preset specific character and symbol is input using the gripped housing.

The operating in a second mode may further include performing the specific function using additional information input together with at least one of the preset specific character and symbol.

The method may further include activating a first function for performing the specific function and at least one second function related to the first function.

Advantageous Effects

The electronic device and the method for controlling the electronic device according to the present invention have the following advantages.

According to at least one embodiment of the present invention, it is possible to provide an electronic device capable of operating in different modes depending on user manipulation performed thereon.

The above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other

BRIEF DESCRIPTION OF THE DRAWINGS

FIGS. 13 and 14 illustrate operations of the electronic device according to some embodiments of the present invention.

DESCRIPTION OF EXEMPLARY EMBODIMENTS

Figure 1:
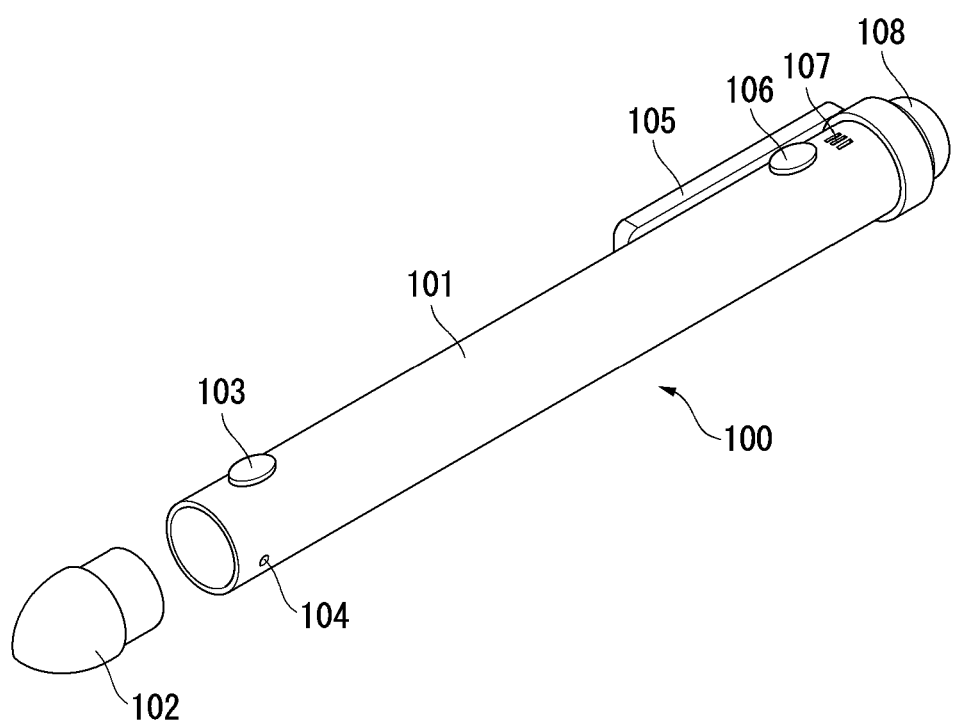
FIG. 1 illustrates an electronic device according to some embodiments of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected to" another element, the element can be connected with the other element or intervening elements may also be present. In contrast, when an element is referred to as being "directly connected to" another element, there are no intervening elements present.

A singular representation may include a plural representation unless it represents a definitely different meaning from the context.

Terms such as "include" and "has" are used herein and should be understood that they are intended to indicate the existence of several components, functions or steps, disclosed in the specification, and it is also understood that greater or fewer components, functions, or steps may likewise be utilized.

Electronic devices presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of electronic devices. However, such teachings apply equally to other types of terminals, such as those types noted above. In addition, these teachings may also be applied to stationary terminals such as digital TVs, desktop computers, digital signage and the like.

It should be understood that implementing all of the components illustrated in FIGS. 1 to 15 is not a requirement, and that greater or fewer components may alternatively be implemented.

FIG. 1 illustrates an electronic device according to one embodiment of the present invention.

An electronic device 100 may include a housing 101, a tip 102, a sensor 103, a microphone hole 104 for a microphone, a clip 105, a sensor 106, a speaker hole 107 for a speaker and a cap 108. More specifically, the housing 101 may take an elongated shape. The housing 101 may be for gripping convenience of a user. For example, the housing 101 may have an elongated cylinder shape.

One end of the tip 102 may be sharp. The other end of the tip 102 may be combined with one end of the housing 101. The tip 102 may be combined with one end of the housing 102 such that the user can grip the housing 102 and write with the tip 102. The tip 102 may be made of a flexible material or a rigid material. The tip 102 may include a pressure sensor 149 therein, which will be described later.

The sensors 103 and 106 may be provided to the outer face of the housing 101. The sensors 103 and 106 may include a sensor for sensing whether the user grips the housing, a sensor for recognizing a fingerprint of the user, a sensor for recognizing a retina of the user and a camera module including an image sensor. In addition, the sensors may be provided on buttons. The user can push the sensors with a finger to execute functions assigned thereto. A sensor may be configured to execute a function of an input device of another electronic device such as a mouse by using the aforementioned pressure sensor of the tip 102 and a button. Functions of sensors can be configured in various manners as necessary.

The microphone may be included in the housing 101 and a microphone hole 104 may be formed in the housing 101. The speaker may be included in the housing 101 and a speaker hole 107 may be formed in the housing 101. A recording function, a multimedia function, a voice transmission/reception function, and the like can be implemented according to a selective or integrated configuration of the microphone and the speaker.

The clip 105 may be combined with one side of the housing 101 or integrated with the housing 101. The cap 108 may be combined with the end of the housing 101 opposite the side combined with the top 102. The cap 108 may be a cover of an opening of the housing 101 or a button and may include a pressure sensor. The function of the cap 108 may be configured in various manners as necessary.

Figure 2:
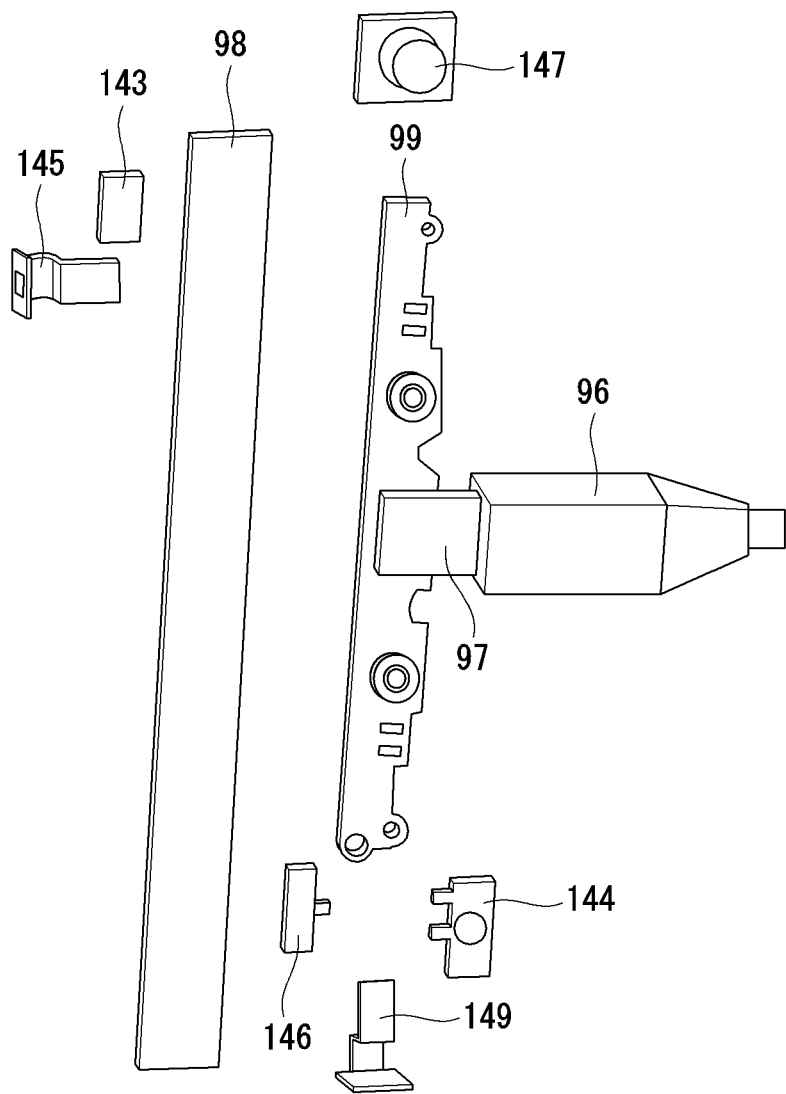
FIG. 2 illustrates electronic elements of the electronic device according to some embodiments of the present invention.

FIG. 2 illustrates electronic elements of the electronic device according to one embodiment of the present invention. The electronic elements may include a PCB 99, a gyro sensor 143, an acceleration sensor 144, an angular acceleration sensor 145, a finger scan sensor 146, an eye-tracking sensor 147, and a pressure sensor 149.

More specifically, components of the electronic device which will be described with reference to FIG. 15 may be mounted on the PCB 99 or an FPCB 98. A connector 97 may be mounted on the PCB 99. The connector 97 can be electrically connected to an external terminal 96. The connector 97 and an external terminal 96 may be data transfer lines or wires for supplying power.

The gyro sensor 143 may be an element which measures repulsive power generated when an object including a gyroscope rotates and converts the repulsive power into an electrical signal. The gyro sensor measures motion of an object in an inertial coordinate system to sense a moving distance and direction and can recognize a path of the object in three-dimensional space. For example, the gyro sensor 143 may be a MEMS gyro sensor.

The acceleration sensor 144 can sense intensity of acceleration or impact of a moving object. The acceleration sensor 144 measures motion of an object in the inertial coordinate system and can recognize a path of the object. For example, the acceleration sensor 144 may be a MEMS acceleration sensor.

For example, if an object moves in two dimensions, one gyro sensor 143 and two acceleration sensors 144 are needed. If an object moves in three dimensions, as another example, three gyro sensors 143 and three acceleration sensors 144 are needed.

The angular acceleration sensor 145 may be a gyro sensor which senses rotational motion of an object in the inertial coordinate system. The angular acceleration sensor 145 may be integrated with the gyro sensor 143 and the acceleration sensor 144 to improve sensor sensitivity.

The finger scan sensor 146 can recognize a user by acquiring a digital image of a fingerprint of the user. For example, optical, ultrasonic, and capacitive finger scan sensors may be used.

The eye-tracking sensor 147 can sense a user's eye and recognize the position of a user's gaze by tracking motion of a retina. The pressure sensor 149 can convert a force applied thereto into an electrical signal to measure the magnitude of the force.

Figure 3:
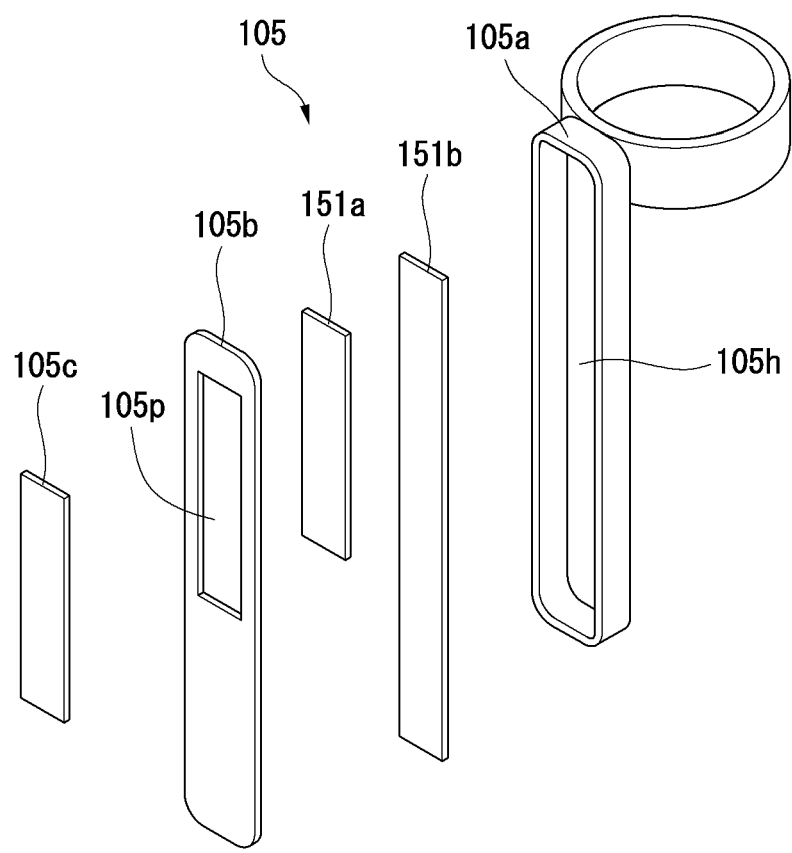
FIG. 3 illustrates a pin according to some embodiments of the present invention.

FIG. 3 illustrates a pin according to one embodiment of the present invention. The pin 105 may include a holder 105*a*, a display module 151, a cover 105*b* and a window 105*c*.

The holder 105*a* may be combined with one side of the housing 101 in such a manner that one side of the housing 101 is inserted into the holder 105*a* or may be integrated with the housing 101. The holder 105*a* may elastically move with respect to the housing 101. The holder 105*a* may include a groove 105*h* in which the display module 151 is mounted.

The display module 151 may include a PCB 151*b* and a display panel 151*a*. The PCB 151*b* may have electronic elements for controlling the display panel 151*a* mounted thereon. The display panel 151*a* may be electrically connected to the PCB 151*b* to display predetermined information. The display module 151 may be a flexible display adapted to elastic motion of the holder 105*a*.

The cover 105*b* may be combined with the holder 105*a* to fix the display module 151 when the display module 151 is mounted in the groove 105*h* of the holder 105*a*. The cover 105*b* may have an opening 105*p* at a position corresponding to the display module 151. The window 105*c* may be combined with the opening 105*p* to protect the display. The window 105*c* may include a touch window for the purpose of input in addition to display protection.

Figure 4:
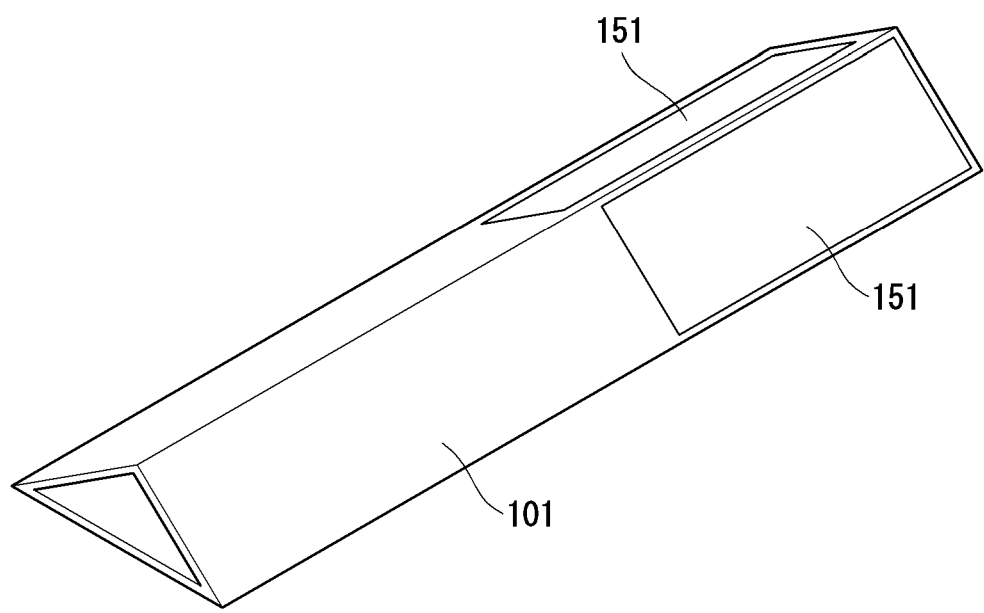
FIGS. 4 to 6 illustrate housings according to other embodiments of the present invention.

FIG. 4 illustrates a housing according to another embodiment of the present invention.

The housing 101 may be elongated and have a triangular cross section. When the housing 101 has a triangular cross section, gripping convenience of the user can be improved and rolling of the electronic device 100 can be prevented. The display 151 may be provided to the outer face of the housing 101. The components described with reference to FIGS. 1 to 3 can be included in the housing.

Figure 5:
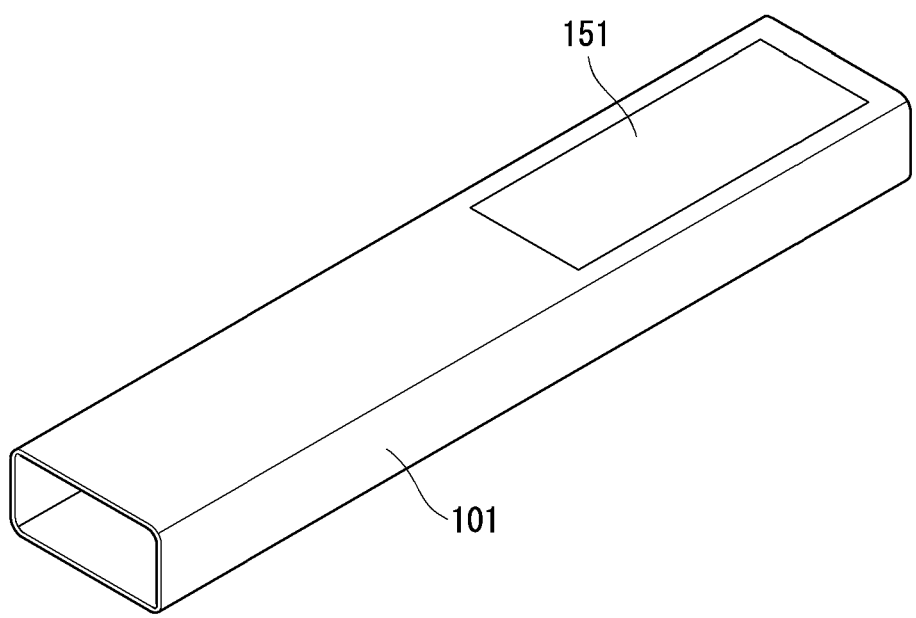

FIG. 5 illustrates a housing according to another embodiment of the present invention.

The housing 101 may be elongated and have a rectangular cross section. When the housing 101 has a rectangular cross section, the area (which can include the area of the display) of one face of the housing 101 can be widened and rolling of the electronic device 100 can be prevented. The display 151 may be provided to a wider outer face of the housing 101. The components described with reference to FIGS. 1 to 3 can be included in the housing.

Figure 6:
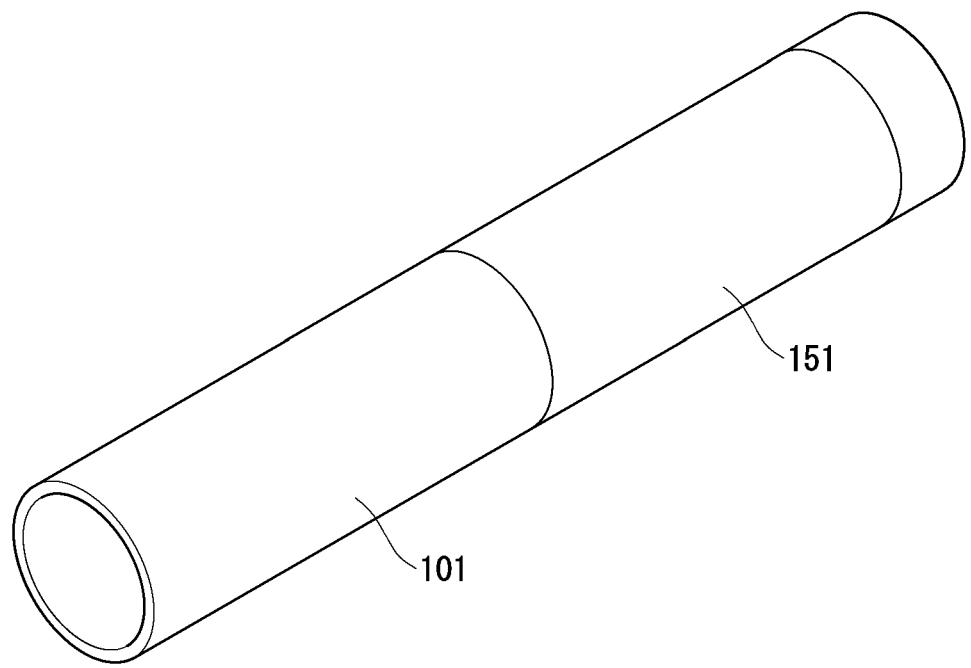

FIG. 6 illustrates a housing according to another embodiment of the present invention.

The housing 101 may be elongated and have a circular cross section. When the housing 101 has a circular cross section, user convenience can be provided such that the user does not consider directivity of the housing 101. The display 151 may be provided to surround at least part of the outer surface of the housing 101. Accordingly, a display with a wider area can be provided. Furthermore, a display with an infinite area may be provided in such a manner that information displayed on the display is scrolled as the cylindrical display rotates. The components described with reference to FIGS. 1 to 3 can be included in the housing.

Figure 7:
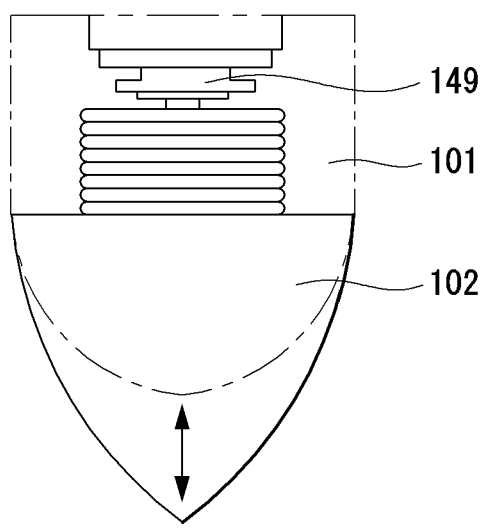
FIGS. 7 and 8 illustrate tips according to some embodiments of the present invention.

FIG. 7 illustrates a tip according to another embodiment of the present invention.

One side of the tip 102 is combined with the housing 101 and the other side may have a narrower cross section than the one side thereof. This means that the tip 102 tapers from the housing 101. The end of the tip 102 may be rounded. The tip 102 may be made of an elastic material. The tip 102 may be made of a rigid material. A predetermined displacement or deformation may occur in the tip 102 according to force applied thereto. Such displacement or deformation may be sensed by the pressure sensor 149.

Figure 8:
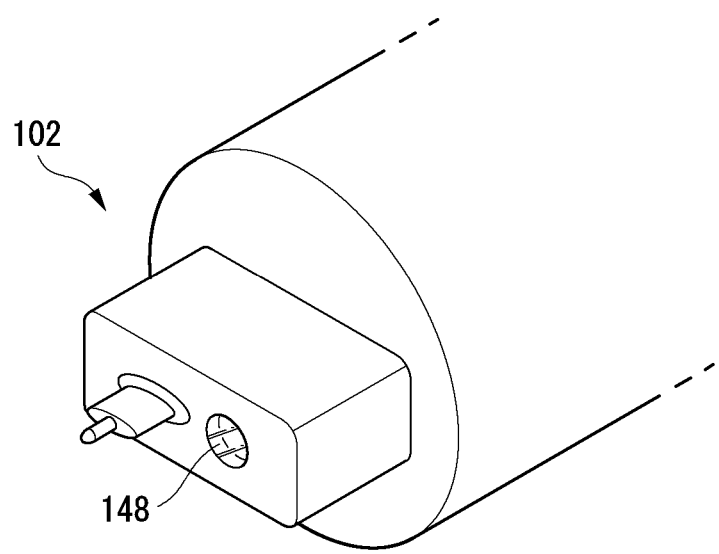

FIG. 8 illustrates a tip according to another embodiment of the present invention.

The tip 102 may be formed as multi-stage protrusions. An optical sensor 148 may be provided to one side of the tip

102. The optical sensor 148 can sense a motion (or trajectory) of the tip. The optical sensor 148 can emit a laser to the tip and measure the laser reflected from the surface of the tip to track a motion of the tip 102. Accordingly, the electronic device is not limited to write on any surface or any attributes of writing area.

Figure 9:
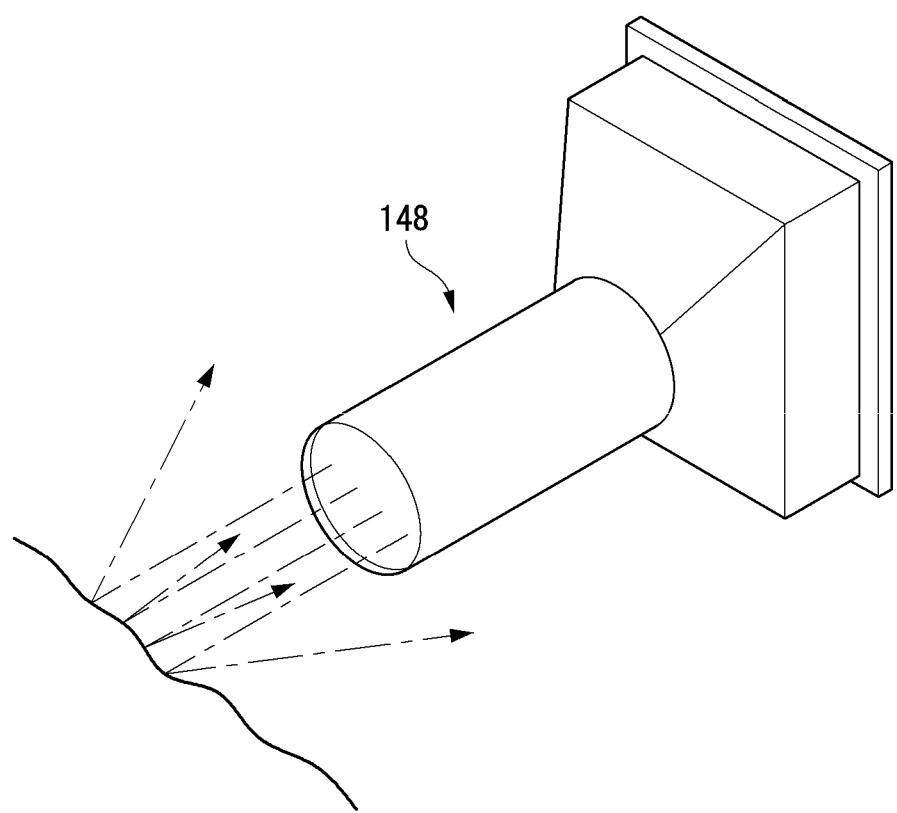
FIG. 9 illustrates an optical sensor according to some embodiments of the present invention.

FIG. 9 illustrates an optical sensor according to one embodiment of the present invention.

The optical sensor 148 can emit a laser. The emitted laser can be reflected from a writing surface. Some light may be deviated from the range of the optical sensor 148 and some light may be measured within the range of the optical sensor 148 depending on the writing surface. For example, the optical sensor 148 can have specifications of a resolution of 2000 dpi, a motion velocity of 0 to 1000 mm/sec, optical power of 0.3 mW and a wavelength of 850 nm.

Figure 10:
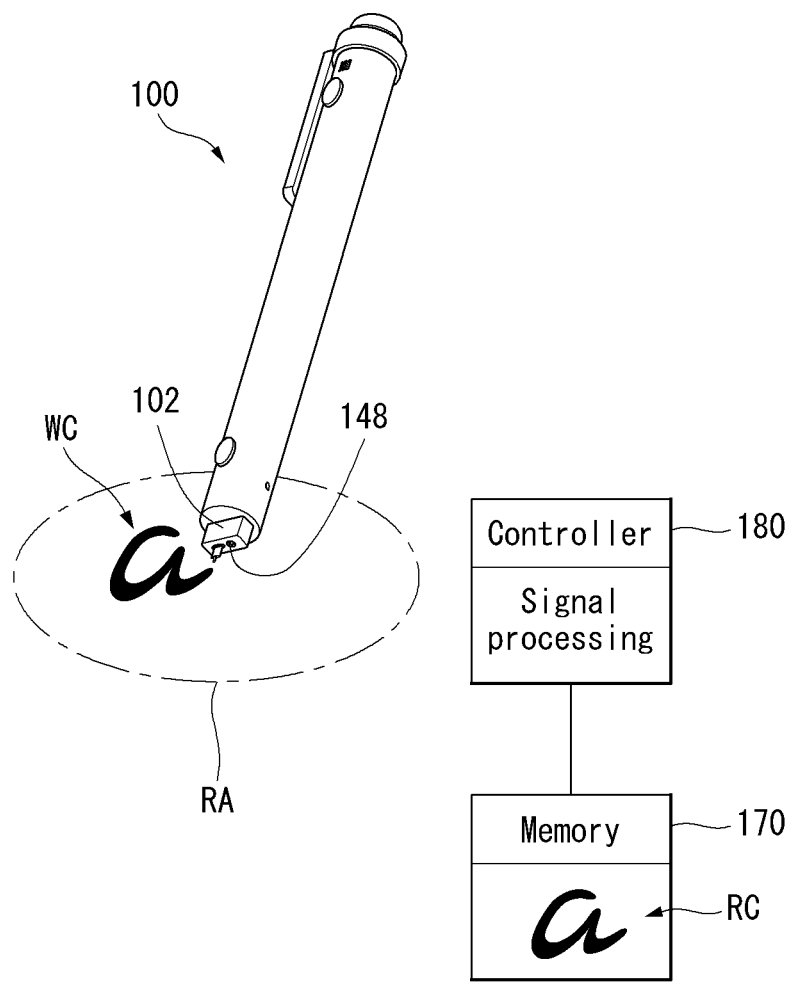
FIGS. 10 and 11 illustrate modes of the electronic device according to some embodiments of the present invention.

FIG. 10 illustrates an electronic device mode according to one embodiment of the present invention.

The electronic device mode illustrated in FIG. 10 may be a writing mode. When the user grips the electronic device 100 and writes, the tip 102 is moved (or follows a trajectory) according to user's intention and the optical sensor 148 measures such motion or trajectory and transmits a signal corresponding to the measurement result to a controller 180. The controller 180 may process the signal transmitted from the optical sensor 148 and store the processed signal in a memory 170. For example, when the user writes (RA) a character WC corresponding to the letter "a", the optical sensor 148 measures the motion of the tip 102 and the controller 180 can process a signal output from the optical sensor 148 and store information RC of character "a" in the memory 170.

Figure 11:
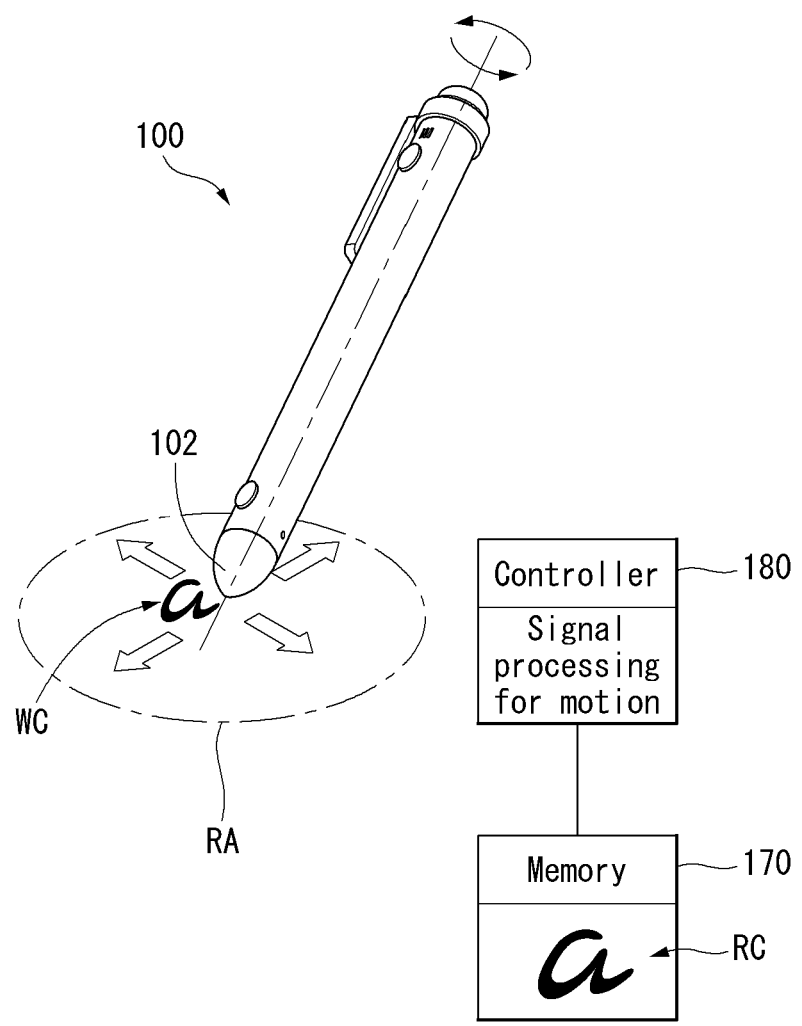

FIG. 11 illustrates an electronic device mode according to another embodiment of the present invention.

The electronic device mode illustrated in FIG. 11 may be a writing mode. When the user grips the electronic device 100 and writes, the tip 102 is moved (or follows a trajectory) according to user's intention and a sensor module measures such motion or trajectory and transmits a signal corresponding to the measurement result to the controller 180. The sensor module may include the gyro sensor 143, the acceleration sensor 144 or the angular acceleration sensor 145. The position of the sensor module may be close to the tip 102 or separated from the tip 102. The position of the sensor module is not limited as long as measurement sensitivity is secured. The controller 180 can process the signal transmitted from the sensor module and store the processed signal in the memory 170. For example, when the user writes a character WC corresponding to the letter "a", the sensor module measures the motion of the tip 102 and the controller 180 can process a signal output from the sensor module and store information RC of character "a" in the memory 170. Here, the sensor module may measure a motion or a trajectory of the housing 101 and transmit a signal corresponding to the measurement result to the controller 180.

Figure 12:
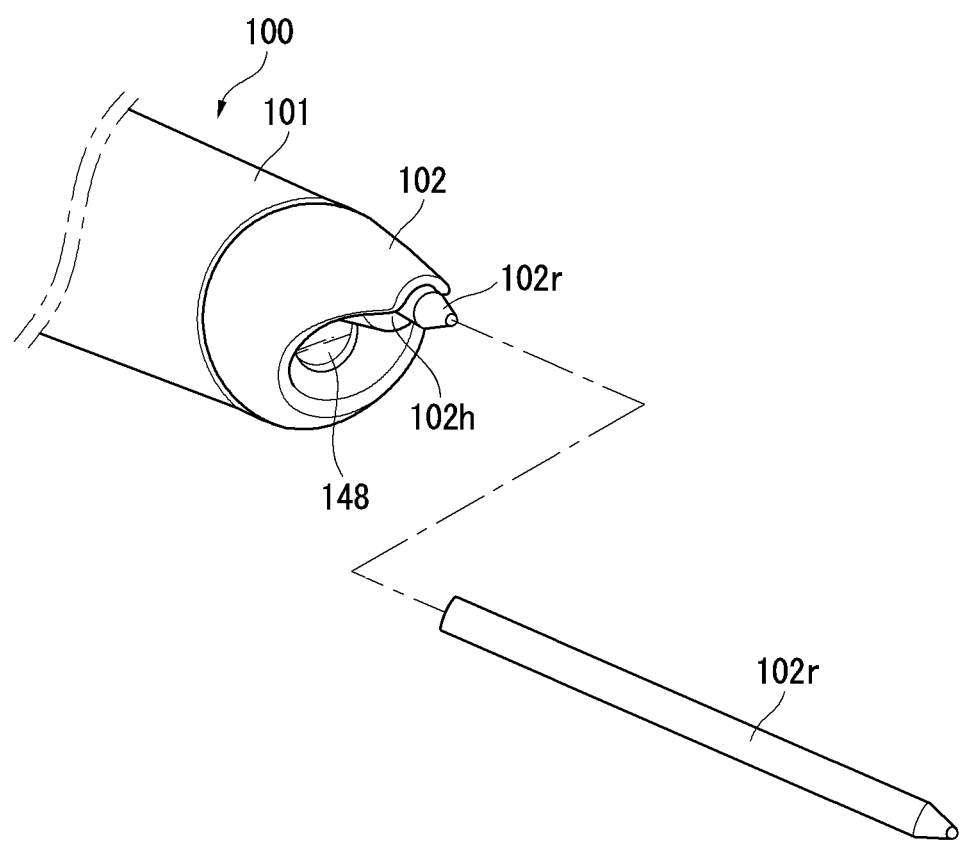
FIG. 12 illustrates an electronic device tip according to other embodiments of the present invention.

FIG. 12 illustrates a tip of the electronic device according to another embodiment of the present invention.

The electronic device 100 may include a nib 102*r*. The nib 102*r* may be refill ink for ballpoint pens, a water-based or oil-based pen, a lead, electronic ink, or the like. The tip 102 may include a fastening hole 102*h* for combining the nib 102*r* therewith. The fastening hole 102*h* may be formed in the tip 102 or formed in the tip 102 and the housing 101. The optical sensor 148 may be positioned near the nib 102*r*. Accordingly, the user can write a note, and the note can be digitalized and stored. For example, when the user attends a lecture, the user can write the contents of the lecture and the written contents can be stored as digital text. In addition, the written contents may be transmitted to another electronic device simultaneously with writing. When the user delivers a lecture as another example, the user can write the contents of the lecture simultaneously with lecture and the written contents can be stored as digital text and transmitted to attendees. Accordingly, users can concentrate on the lecture without the need to write down the contents of the lecture.

FIG. 13 illustrates an operation of the electronic device according to one embodiment of the present invention.

As shown, the electronic device 100 according to an embodiment of the present invention may perform a communication function.

As illustrated in FIG. 13(*a*), the electronic device 100 can directly communicate with an access point (AP). For example, the electronic device 100 can transmit data to the AP using a wireless antenna embedded therein and receive data from the AP. This feature differs from conventional devices subordinate to another terminal owned by a user.

As illustrated in FIG. 13(*b*), the electronic device 100 communicating with the AP can transmit data to another electronic device 200. For example, the electronic device 100 can relay data to the electronic device 200 paired therewith.

Figure 14:
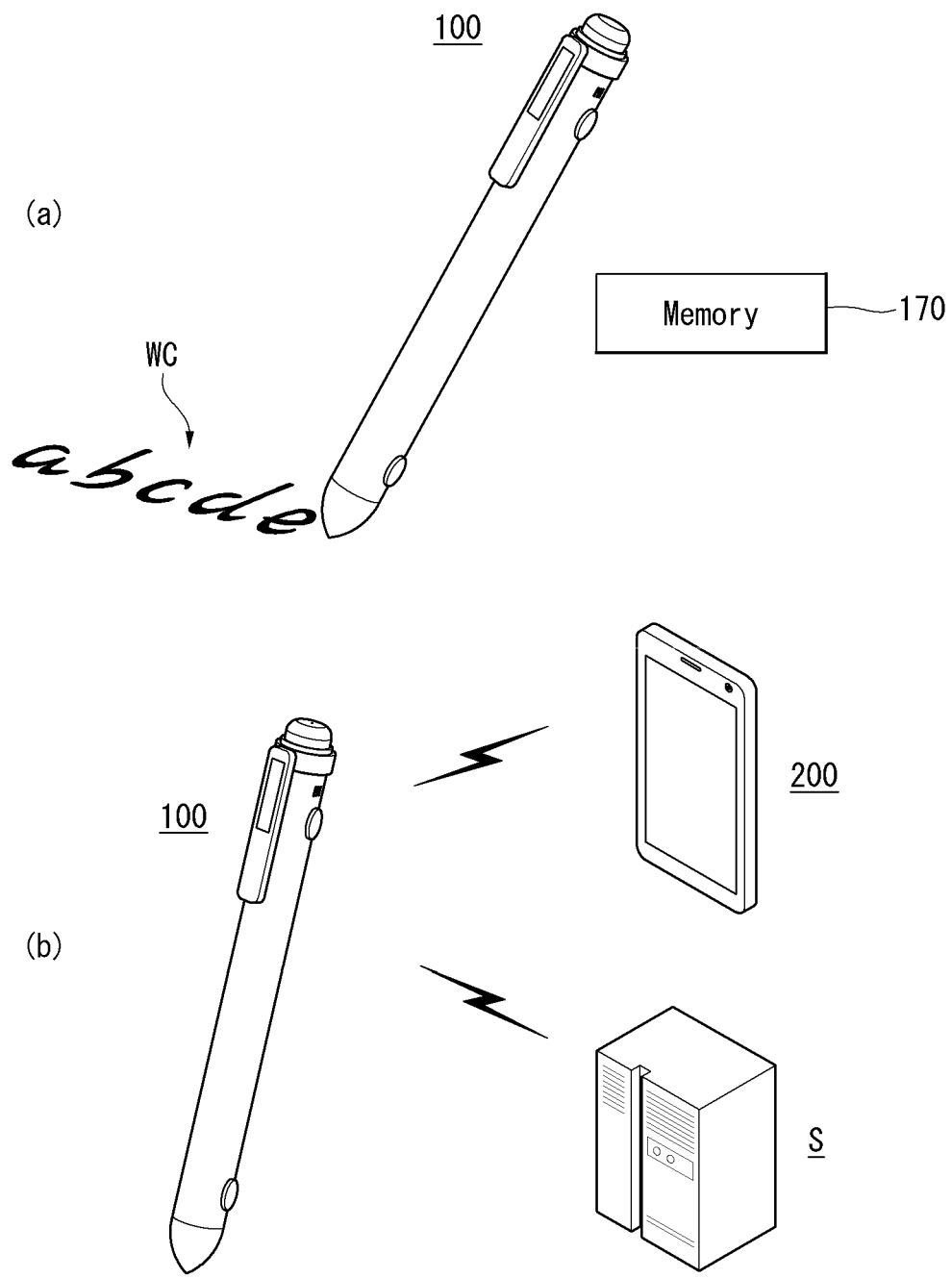

FIG. 14 illustrates an operation of the electronic device according to one embodiment of the present invention.

As shown, the electronic device 100 according to an embodiment of the present invention can store and/or transmit content WC in various manners.

As illustrated in FIG. 14(*a*), the user can generate the content WC using the electronic device 100. For example, the user can write letters using the electronic device 100 in the form of a pen. The electronic device 100 can recognize the letters which is the content WC generated by the user using an optical sensor and/or an acceleration sensor.

The electronic device 100 may store the content WC generated by the user in a text format and/or an image format in the memory 170 included in the electronic device 100. That is, the controller 180 of the electronic device 100 can recognize the content WC generated by the user and store the content WC in the text format such that the entire storage capacity does not increase. When the content WC cannot be easily recognized or the content WC is a picture, the controller 180 may store the content WC in the image format.

As illustrated in FIG. 14(*b*), the controller 180 may synchronize the electronic device 100 with another device 200. During synchronization with the other device 200, the controller 180 may transmit the content WC stored in the memory 170. Synchronization with the other device 200 can be performed when the electronic device 100 is in an idle state.

The controller 180 may synchronize the content WC stored in the memory 170 with an external server S and transmit the content WC to the external server S.

The controller 180 may delete the content WC synchronized with the other device 200 and/or the external server S from the memory 170. That is, the controller 180 can delete synchronized data in order to free up space of the memory 170.

Figure 15:
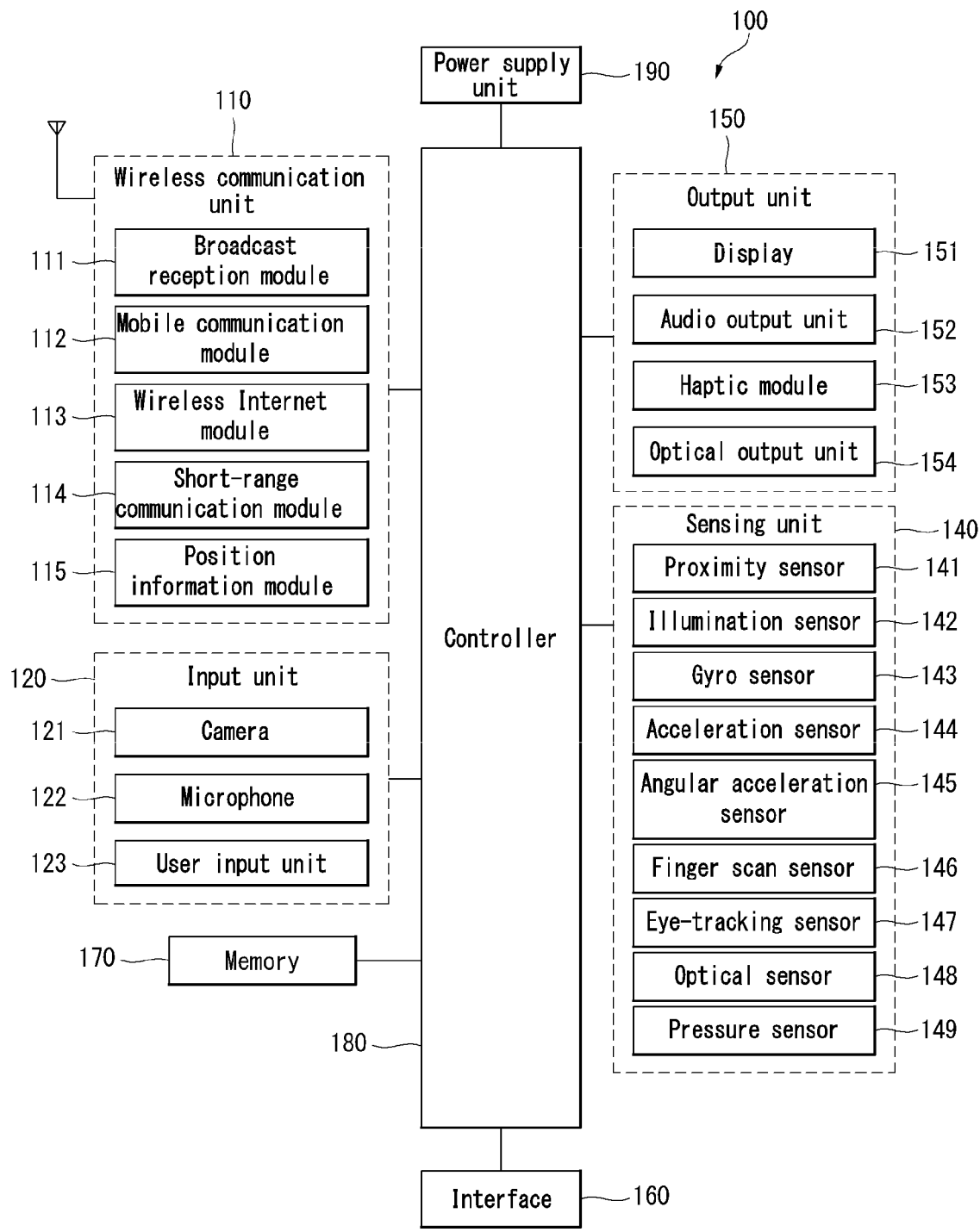
FIG. 15 is a block diagram for describing an electronic device related to the present invention.

FIG. 15 is a block diagram for describing the electronic device related to the present invention.

The electronic device 100 may include a wireless communication unit 110, an input unit 120, a sensing unit 140, an output unit 150, an interface 160, the memory 170, the controller 180 and a power supply unit 190. The components illustrated in FIG. 15 are not essential for implementing the electronic device and thus the electronic device described in the specification may have greater or fewer components.

More specifically, the wireless communication unit 110 among the aforementioned components may include one or more modules which enable wireless communication between the electronic device 100 and a wireless communication system, between the electronic device 100 and another electronic device or between the electronic device 100 and an external device. In addition, the wireless communication unit 110 may include one or more modules which connect the electronic device 100 to one or more networks.

The wireless communication unit 110 may include at least one of a broadcast reception module 111, a mobile communication module 112, a wireless Internet module 113, a short-range communication module 114 and a position information module 115.

The input unit 120 may include a camera 121 or an image input unit for image signal input, a microphone 122 or an audio input unit for audio signal input, and a user input unit 123 (e.g., a touch key, a mechanical key, etc.) through which a user inputs information. Audio data or image data collected by the input unit 120 may be analyzed and processed into a control command of the user.

The sensing unit 140 may include one or more sensors for sensing at least one of information in the electronic device, information on surrounding environments of the electronic device and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera 121), the microphone 122, a battery gauge, environment sensors (e.g., a barometer, a hygrometer, a thermometer, a radioactive sensor, a heat sensor, a gas sensor, etc.), the gyro sensor 143, the acceleration sensor 144, the angular acceleration sensor 145, the finger scan sensor 146, the eye-tracking sensor 147 and the optical sensor 148 which have been described with reference to FIG. 2. The electronic device disclosed in the specification can combine information sensed by at least two of these sensors and use the same.

The output unit 150 generates visual, auditory or tactile output and may include at least one of a display unit 151, an audio output unit 152, a haptic module 153 and an optical output unit 154. The display unit 151 may implement a touchscreen by forming a layered structure with a touch sensor or by being integrated with the touch sensor. Such a touchscreen can serve as the user input unit which provides an input interface between the electronic device 100 and the user and, simultaneously, provide an output interface between the electronic device 100 and the user.

The interface 160 serves as a path to various external devices connected to the electronic device 100. The interface 160 may include at least one of a wired/wireless headset port, an external charger port, a wired/wireless data port, a memory card port, a port for connecting a device including an identification module, an audio input/output (I/O) port, a video I/O port and an earphone port. The electronic device 100 can perform appropriate control related to an external device connected thereto in response to connection of the external device to the interface 160.

The memory 170 stores data supporting various functions of the electronic device 100. The memory 170 can store various application programs (or applications) executed in the electronic device 100, data and commands for operation of the electronic device 100. At least part of such application programs can be downloaded from an external server through wireless communication. In addition, at least part of such application programs may have been installed in the electronic device 100 when the electronic device 100 is delivered for basic functions (e.g., call sending and receiving function, message sending and receiving functions) of the electronic device 100. The application programs may be stored in the memory 170 and installed in the electronic device 100 such that the application programs can be executed by the controller 180 to perform operations (or functions) of the electronic device.

The controller 180 controls the overall operation of the electronic device 100 in addition to operations related to the application programs. The controller 180 can process signals, data, information and the like input or output through the aforementioned components and execute the application programs stored in the memory 170 to provide or process information or functions suitable for the user.

In addition, the controller 180 may control at least part of the components described with reference to FIG. 15 in order to execute the application programs stored in the memory 170. Furthermore, the controller 180 may combine at least two of the components included in the electronic device 100 and operate the same in order to execute the application programs.

The power supply unit 190 is provided with external power and internal power under the control of the controller 180 and supplies power to each component included in the electronic device 100. The power supply unit 190 includes a battery and the battery may be an embedded battery or a replaceable battery.

Figure 16:
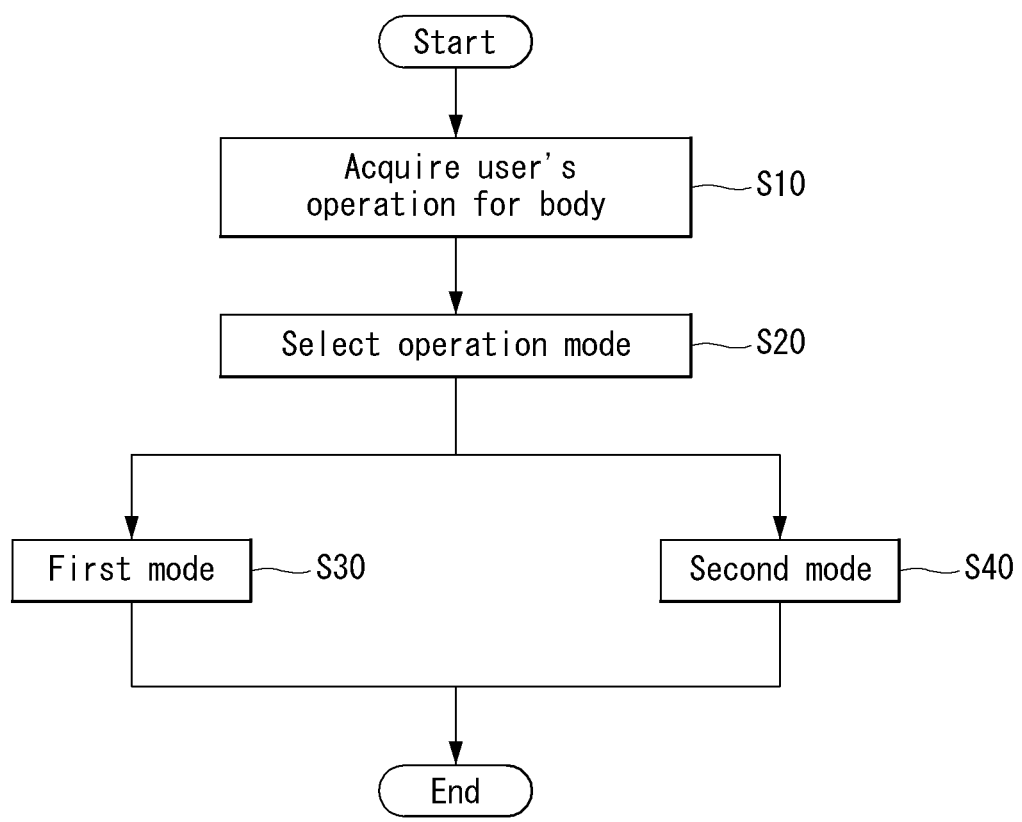
FIGS. 16 to 18 are a flowchart illustrating an operation of the electronic device according to one embodiment of the present invention.
Figure 17:
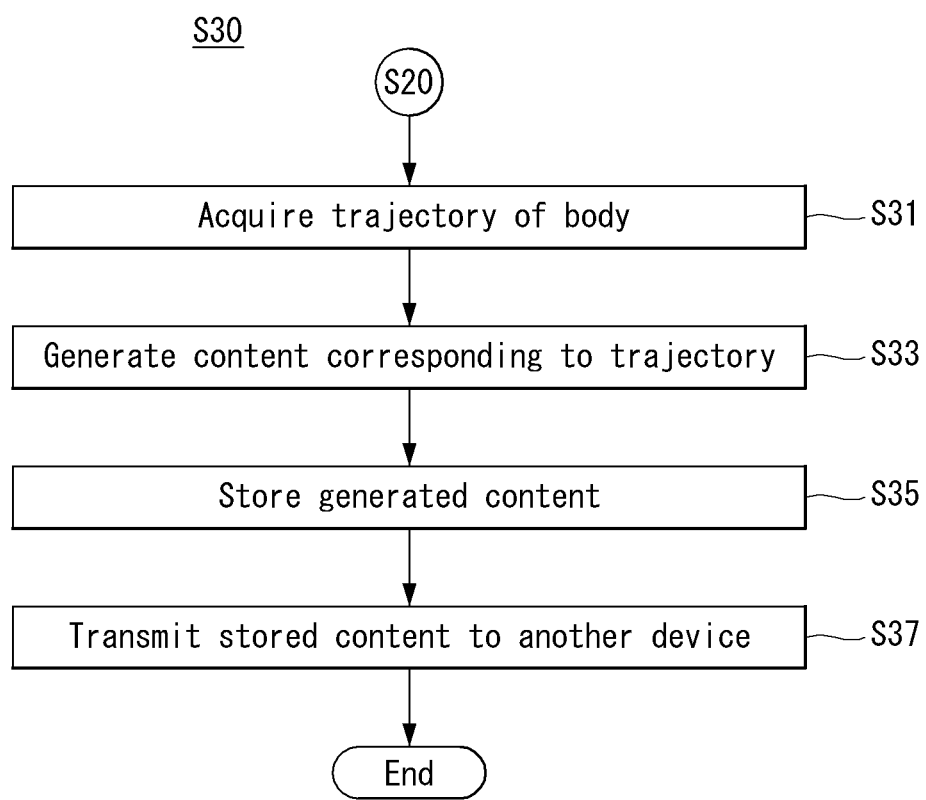
Figure 18:
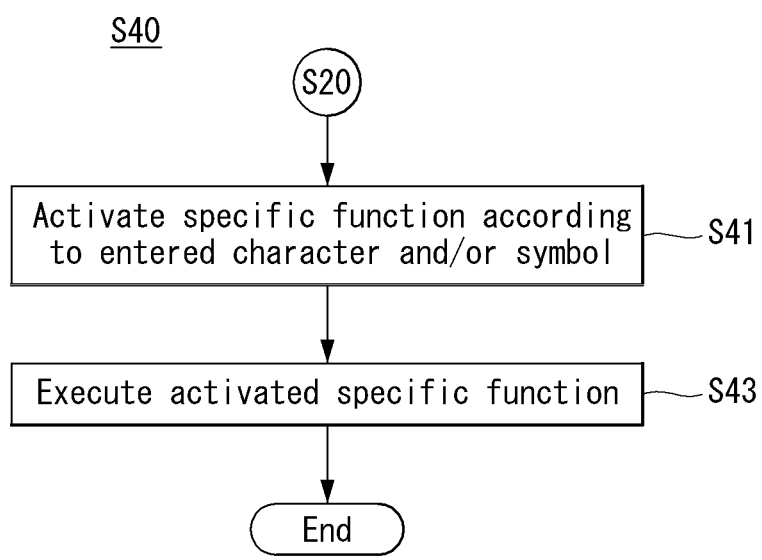

At least parts of the aforementioned components may cooperatively operate in order to implement operations, control or control methods of the electronic device according to various embodiments which will be described below. In addition, the operations, control or control methods of the electronic device may be implemented in the electronic device according to execution of at least one of the application programs stored in the memory 170. FIGS. 16 to 18 are flowcharts illustrating operations of the electronic device according to one embodiment of the present invention.

As shown in these figures, the controller 180 of the electronic device 100 according to one embodiment of the present invention can operate in different operation modes based on the intentions of the user.

As shown in FIG. 16, the controller 180 may perform step S10 of acquiring user's operation for the housing 101.

The controller 180 may acquire user manipulation applied to the housing 101 through the sensing unit 140. For example, the controller may recognize whether the user wants to input any character, symbol, and/or image when the user performs a handwriting operation while gripping the housing 101.

The sensing unit 140 may be a combination of at least one of the sensors including the optical sensor 148, the gyro sensor 143, the acceleration sensor 144 and the angular acceleration sensor 145. For example, the sensing unit 140 may track a trajectory of the tip 102 when the user writes while gripping the housing 101.

The controller 180 may perform step S20 of selecting an operation mode according to the user's operation. The operation mode may include a first mode S30 and a second mode S40.

The first mode may be a mode in which content corresponding to a trajectory according to a motion of an end of the housing 101 is stored in the memory 170. That is, the first mode may be a case in which the user who grips the electronic device 100 according to one embodiment of the present invention performs a recording operation. In the first mode, the controller 180 may acquire handwriting input by the user using the sensing unit 140. The acquired handwriting may be stored in a text format in the memory 170. The acquired handwriting may be stored in an image format in the memory 170. Storage in the text format may be more advantageous than storage in the image format in terms of storage capacity.

The second mode may be a mode that performs a function corresponding to the trajectory of the end of the housing 101. For example, the controller 180 may recognize characters and the like corresponding to user manipulation applied to the electronic device 100 as an instruction for controlling operation of the electronic device 100 in the second mode. In the second mode, the controller 180 may not regard characters or the like corresponding to the user's operation as content to be stored in the memory 170. Thus, the user of the electronic device 100 may not operate the electronic device 100 itself to perform various operations using the electronic device 100. For example, the user may activate or deactivate a necessary function without operating a button or the like provided in the electronic device 100.

FIG. 17 is a flowchart illustrating the first mode operation of the electronic device according to one embodiment of the present invention in detail.

In the first mode, the controller 180 may perform step S31 of acquiring a trajectory of the housing 101. More specifically, the trajectory of the housing 101 may refer to a trajectory of the tip 102 located at one end of the housing 101.

The controller 180 may perform step S33 of generating content corresponding to the trajectory. For example, the controller 180 may recognize content such as characters, numerals, a picture and the like input by the user using the electronic device 100.

The controller 180 may extract characters through an image processing procedure when user input is acquired through the optical sensor 148. The extracted characters can be converted into text.

The controller 180 may perform step S35 of storing the generated content. The content can be stored in the memory 170 of the electronic device 100. When the content is text, storage space can be saved.

The controller 180 may perform step S37 of transmitting the stored content to another device. The electronic device 100 according to one embodiment of the present invention may execute communication functions such as call transmission and reception and message transmission and reception. The controller 180 may transmit content stored in the memory 170 to another device of the user. For example, the controller 180 may transmit the content to a device having a larger display. Accordingly, the user may view the content more conveniently.

FIG. 18 is a flowchart illustrating the second mode operation of the electronic device according to one embodiment of the present invention in detail.

In the second mode, the controller 180 may perform a step S41 of activating a specific function according to an inputted characters and/or symbols.

The user may input a specific character and/or symbol into the electronic device 100 griped by the user. The specific characters or the like may be commands that activate and/or deactivate specific functions. For example, if the user grasps the electronic device 100 and inputs a symbol [, the controller may enter the second mode. If the user inputs the symbol [, and then inputs call and then inputs the symbol], it may be seen that the user wants to use a specific function that performs call function.

The controller 180 may perform step S43 of executing the activated specific function. For example, when the character or the like for executing the call function is input as described above, the controller 180 may execute a function of calling using a telephone number or the like input after [call].

Figure 19:
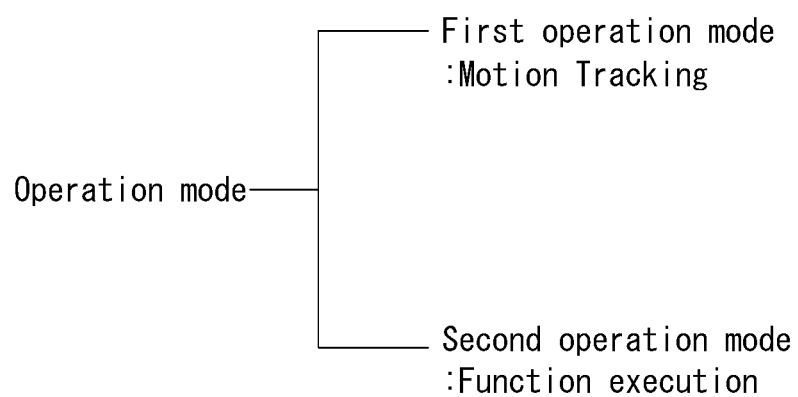
FIG. 19 illustrates an operation mode of the electronic device of FIG. 16.

FIG. 19 illustrates operation modes of the electronic device shown in FIG. 16.

As shown, operation modes may include a first operation mode and a second operation mode. Motion tracking may be performed in the first operation mode and functions may be executed in the second operation mode.

In the first operation mode, the controller 180 may store a motion tracking result as content.

In the second operation mode, the controller 180 may execute a specific function corresponding to user input. That is, the controller 180 does not store user input as content.

FIGS. 20 to 27 illustrate operation processes of the electronic device of FIG. 16.

As shown, the electronic device 100 according to one embodiment of the present invention may operate in different operation modes according to a user's input.

Figure 20:
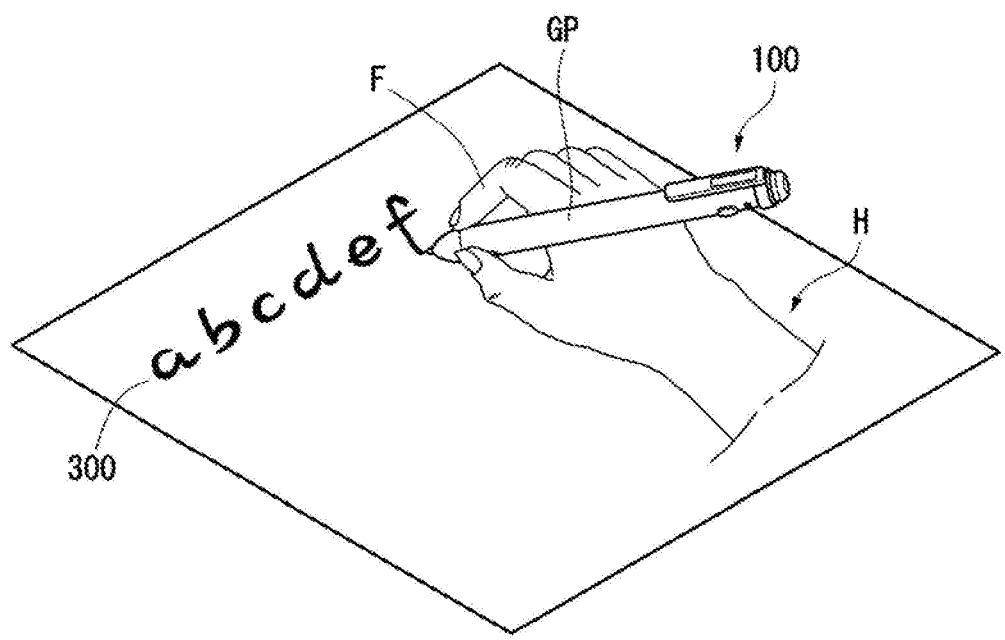
FIGS. 20 to 27 illustrate operation processes of the electronic device of FIG. 16.

As shown in FIG. 20, a user may use the electronic device 100 by griping the electronic device 100 with the hand H. That is, the user may grip the electronic device 100 with one hand H. A plurality of fingers F of one hand H may be brought into contact with the grip portion GP of the electronic device 100. This is different from a conventional device used for griping with both hands. That is, the electronic device 100 according to one embodiment of the present invention in a form that may be griped by a single hand, such as a cylindrical shape, allows the user to perform other necessary operations with the remaining hand. On the contrary, in the conventional device, it has been common to use the device for griping with both hands.

The grip portion GP may be a lower area of the housing 101. The grip portion GP may be coated with rubber or the like or may be processed to correspond to shape of the finger F. Therefore, the finger F that is in contact with the grip portion GP may not slip.

The user may use the electronic device 100 by griping the electronic device 100 in contact with the object 300. The object 300 may be paper or the like. Ink may be stained to the object 300 through the tip 102 that is in contact with the object 300 when the electronic device is used for an object 300 of paper material. Accordingly, the user may visually confirm the characters or the like, which is a trajectory of moving the electronic device 100 by griping the electronic device 100.

If the user writes characters or the like on the object 300, the written content may be sensed through the sensor unit 140. For example, it may be visually sensed through the optical sensor 148 or sensed as a spatial movement through the gyro sensor 143 or the like.

Figure 21:
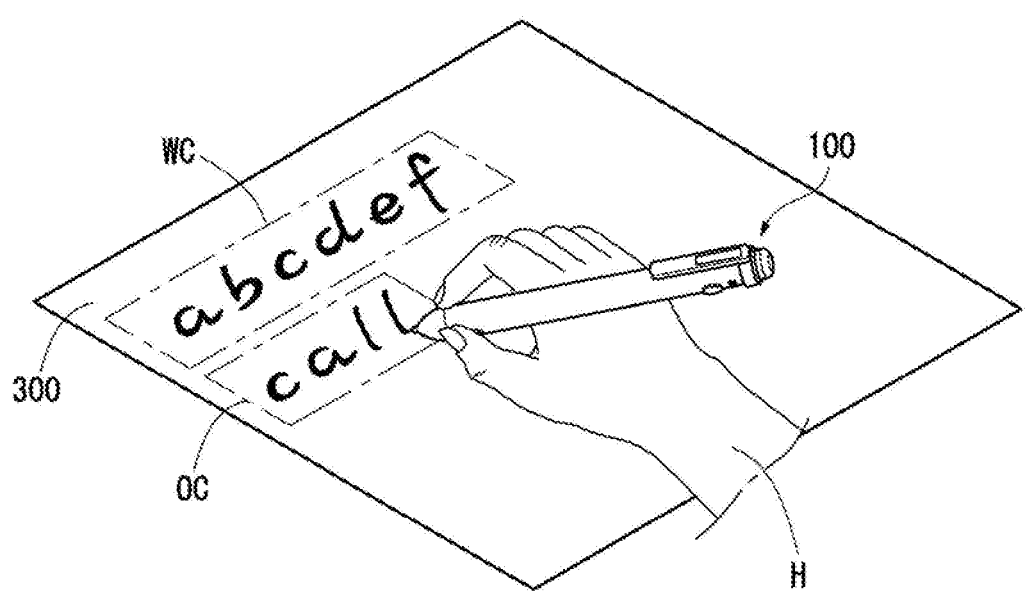

As shown in FIG. 21, some of the user's inputs may be content WC. For example, it may be a description of a matter requiring memo on the object 300.

Some of the user's inputs may be a control command OC. That is, some of the user's inputs may not be a description of a matter requiring memo but may be a command inputted by a user to control the operation of the electronic device 100.

The control command OC may be a combination of at least one of predetermined characters and symbols. For example, the characters called call may be predetermined to the control command OC.

Figure 22:
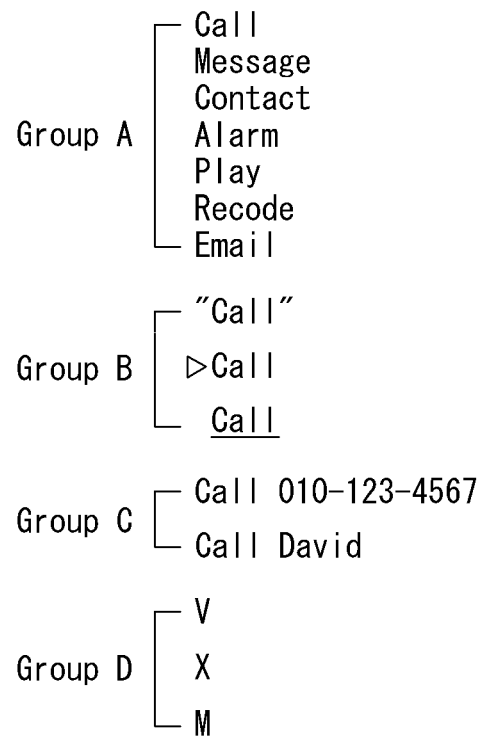

As shown in FIG. 22, specific characters and/or symbols may be set to control commands OC in various forms.

In the case of the group A, specific characters are set as control command OC. For example, if characters called call are input, call function may be performed, and if characters called message are input, message transmission/reception function may be performed. When the specific characters are set to the control command OC, the user may control the electronic device 100 more intuitively.

In the case of the group B, a combination of specific characters and symbols is set to the control command OC. For example, when characters called call are written between the quotation marks, it means that it may be a control command OC corresponding to the call function. In such a case, the possibility of confusion with the input of ordinary content may be reduced.

In the case of the group C, a combination of specific characters and information related to the specific characters is set as a control command OC. For example, it means that it may function as a control command OC when telephone number information or counterpart information is inputted after characters called call is inputted.

In the case of the group D, a specific symbol is set as a control command OC. For example, it means that it may function as a control command OC of call rejection when the X is input.

The controller 180 may perform a specific function including a call function, a message transmission/reception function, a contact display function, an alarm function, a playback function, a recording function, and an e-mail transmission/reception function based on the input specific characters and/or symbols.

Figure 23:
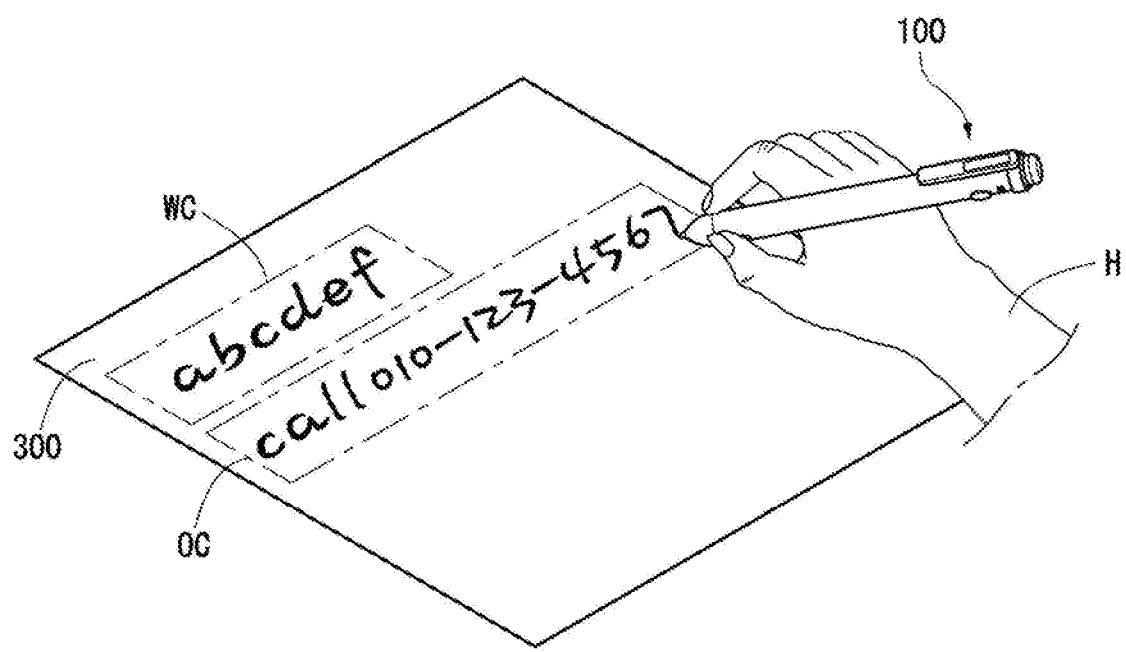

As shown in FIG. 23, the user may input telephone number information following input of characters called call. The controller 180 may recognize the content as a control command OC.

Figure 24:
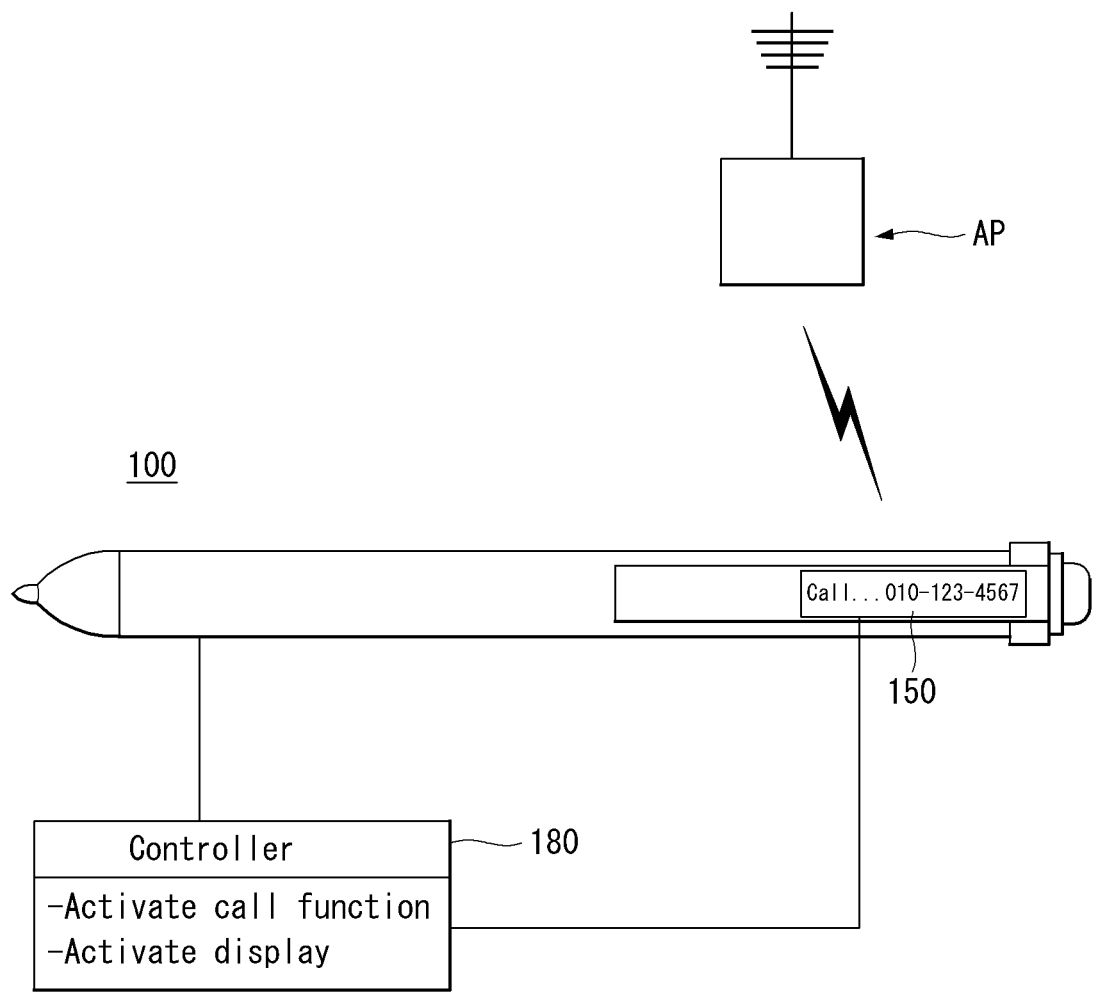

As shown in FIG. 24, when the control command OC is inputted, the controller 180 may activate the call function. That is, the controller may communicate with the access point AP using the wireless communication unit 110.

The controller 180 may further perform other functions related to the activated function. For example, the controller may activate the display 150. The display 150 may be provided on the housing 101 of the electronic device 100. The display 150 may display information related to the function currently being performed.

Figure 25:
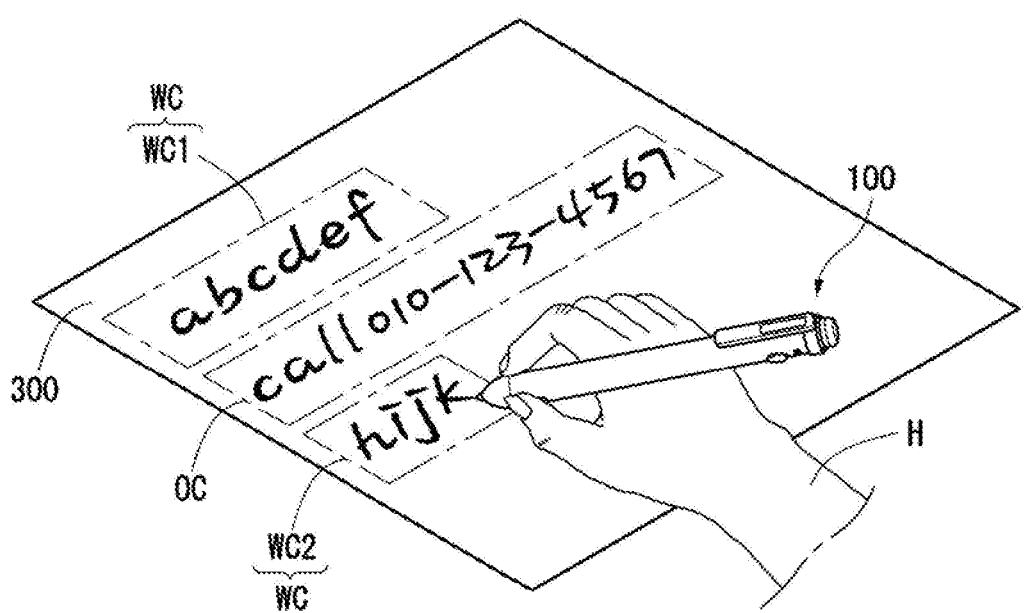

As shown in FIG. 25, a user who has performed a specific control command OC may input content WC again using the electronic device 100. For example, the user may perform an operation of inputting a second content WC2 again after inputting the control command OC for activating the call function.

When the second content WC2 is input, the controller 180 may store the inputted second content WC2 in the memory 170.

The controller 180 may determine whether to hold the specific function activated by the previously input control command OC in response to the input of the second content WC2. For example, the call function may be maintained regardless of whether the second content WC2 is input or not. In this case, the user may input a necessary memo while maintaining the communication with the other party.

Figure 26:
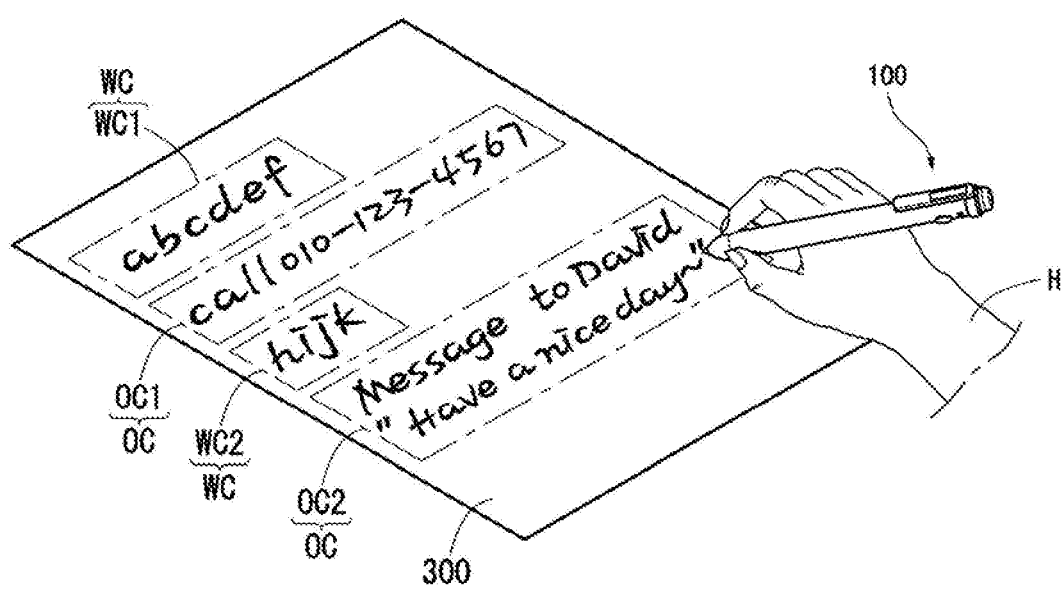

As shown in FIG. 26, the user may input the second control command OC2. For example, the user may activate a message transmission function by inputting a specific command called message. That is, the user may perform the necessary writing on the object 300, and may proceed to generate the content WC and input the control command OC as necessary.

Figure 27:
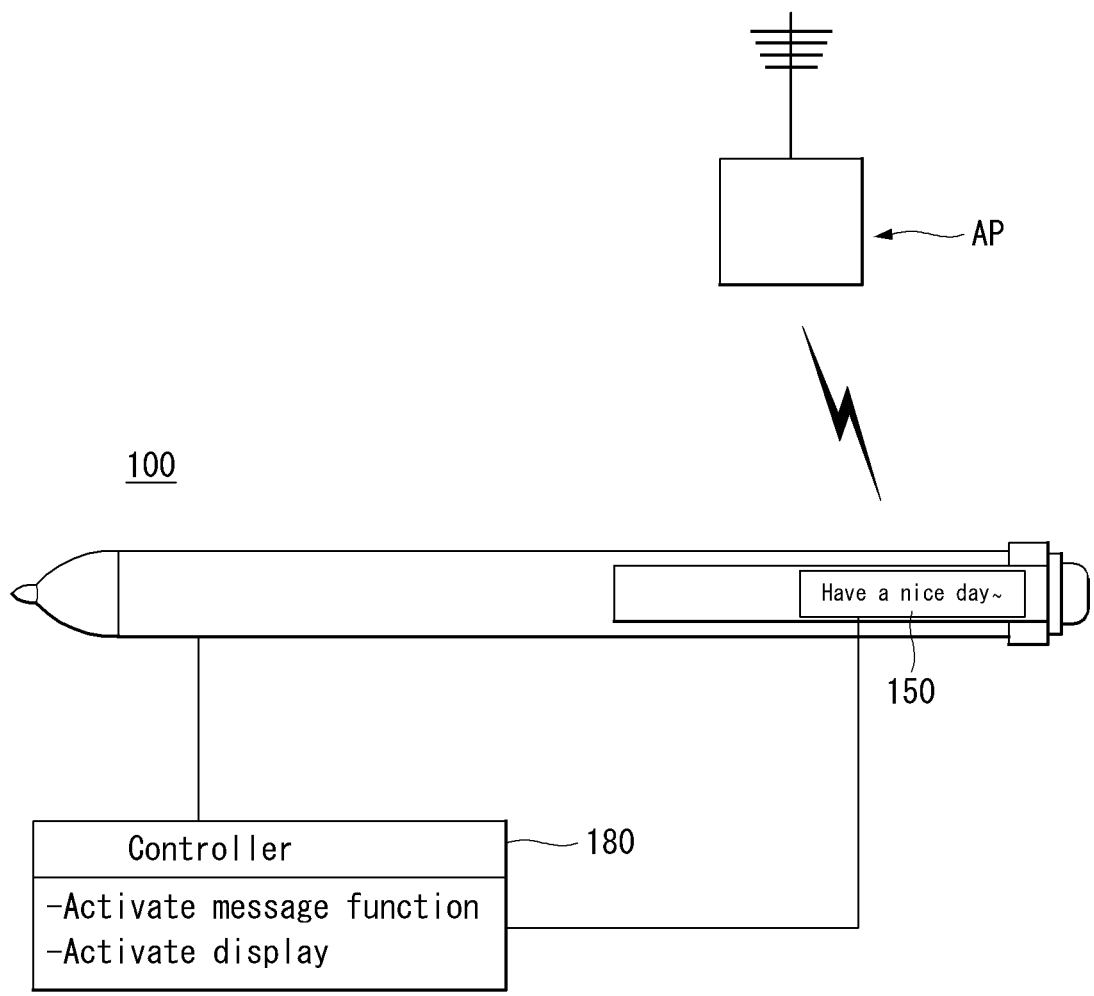

As shown in FIG. 27, the controller 180 may perform a function corresponding to the input second control command OC2. For example, it means that the activation of the message function and/or the activation of the accompanying display function may be performed.

Figure 28:
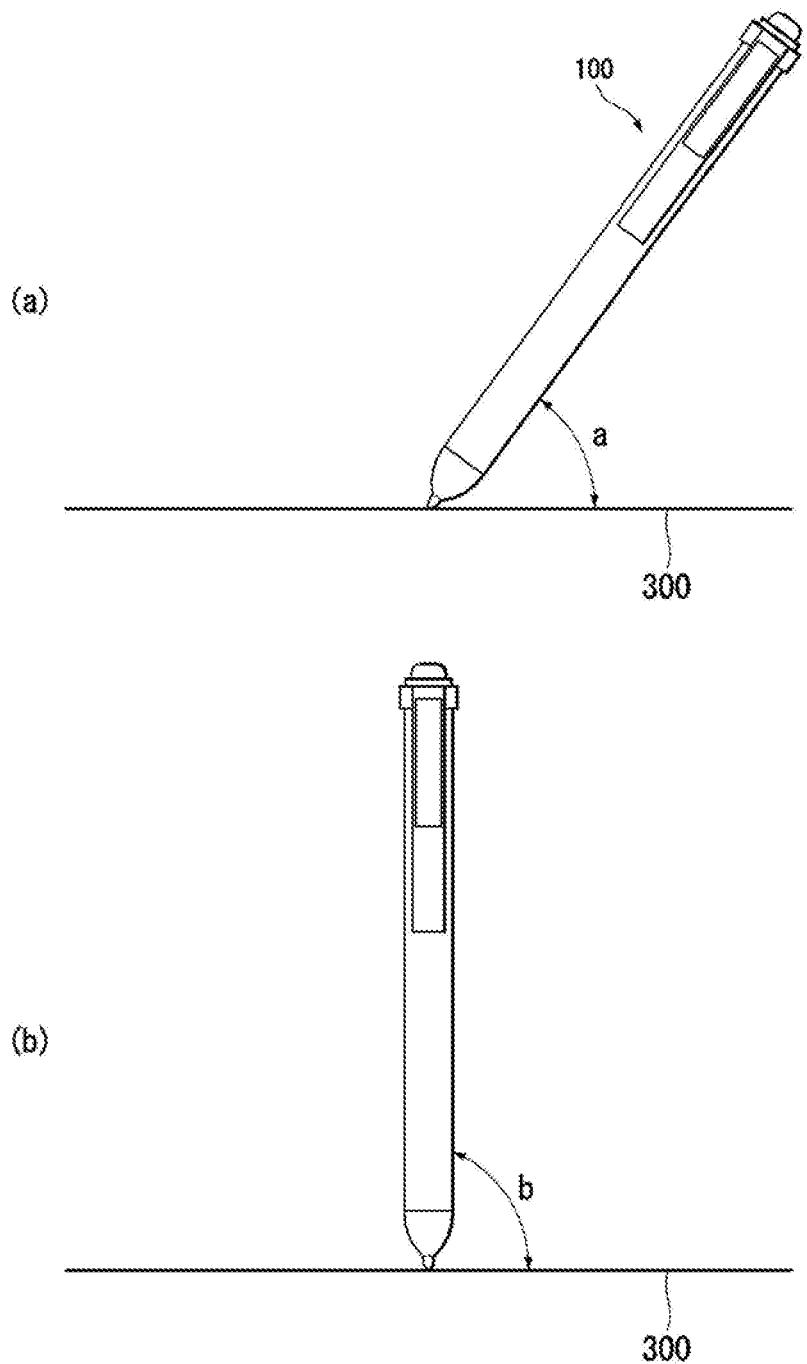
FIGS. 28 and 29 illustrate an operation of the electronic device according to another embodiment of the present invention.
Figure 29:
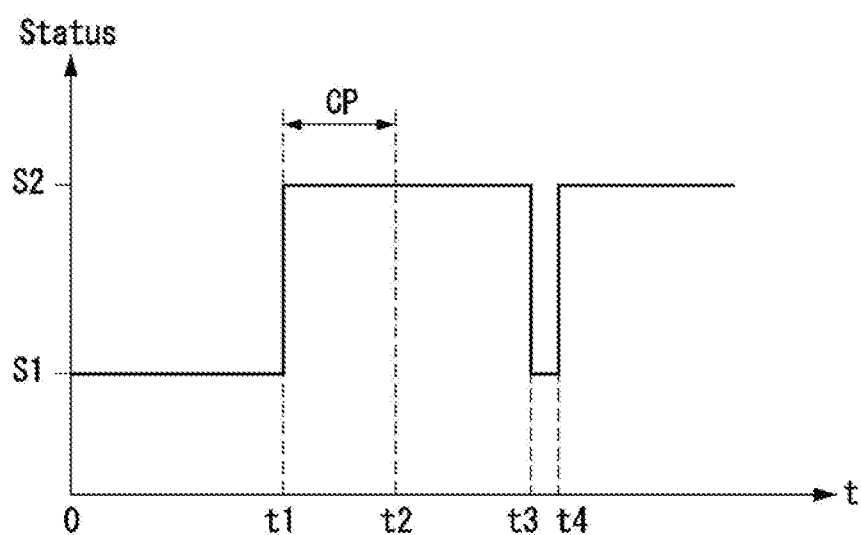

FIGS. 28 and 29 illustrate an operation of the electronic device according to another embodiment of the present invention.

As shown, the electronic device 100 according to another embodiment of the present invention may switch operation modes in response to a specific posture and/or gesture taken by the user.

As shown in FIG. 28 (a), a user may grip the electronic device 100 in a state in which the electronic device 100 is tilted from the object 300 by an angle a. The angle a between the electronic device 100 and the object 300 may be an angle in a common handwriting operation. When such the posture and/or gesture are input, the controller 180 may activate the first operation mode. That is, the controller may determine that the user desires to input content such as a memo.

As shown in FIG. 28 (b), the user may grip the electronic device 100 in a state in which the electronic device 100 is tilted from the object 300 by an angle b. The angle b between the electronic device 100 and the object 300 may be different from the angle in a common handwriting operation. For example, it may be a posture and/or gesture operation that positions the electronic device 100 at a substantially right angle to the object 300. In such a case, the controller 180 may determine that the user intends to enter the second operation mode.

As shown in FIG. 29, the user's posture and/or gesture for the first operation mode and the second operation mode may be significant when they last for a predetermined time or more. For example, at the time t1, the controller 180 may switch from the first operation mode to the second operation mode when the user performs the operation for entering the second operation mode beyond the threshold time CP.

When the user switches the posture to be equal to or less than the critical time CP from the time t3 to the time t4 while the controller is operating in the second operation mode, the controller 180 may not switch the operation mode regardless of switch of the posture. That is, it means that the operation mode may be prevented from being changed even if careless operation is input for a while.

FIGS. 30 to 34 illustrate an operation of the electronic device according to another embodiment of the present invention.

As shown, the electronic device 100 according to another embodiment of the present invention may control an operation of a tip 102 according to an operation mode.

Figure 30:
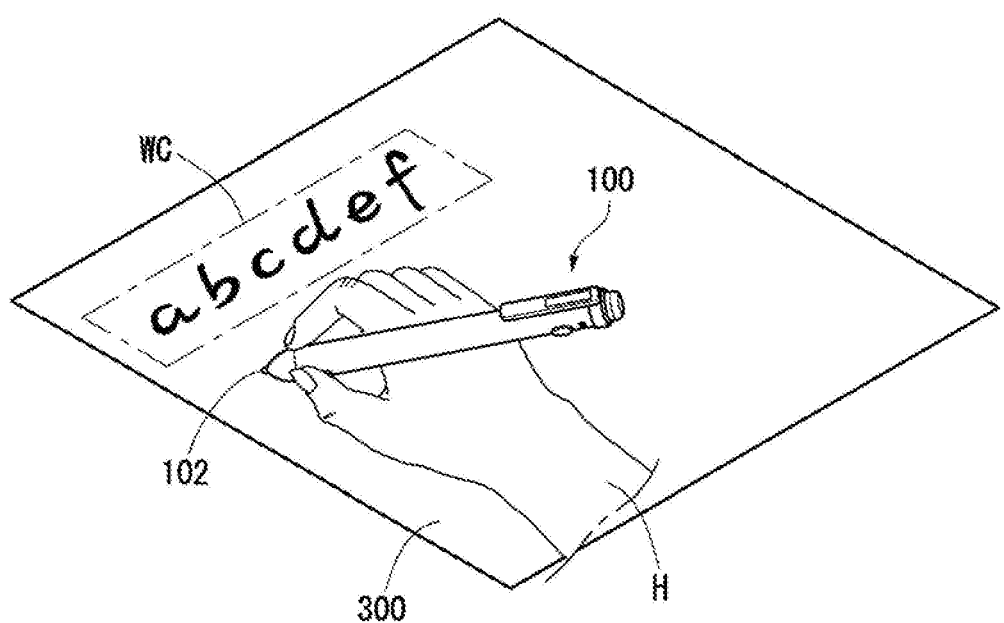
FIGS. 30 to 34 illustrate an operation of the electronic device according to another embodiment of the present invention.

As shown in FIG. 30, the user may input content WC in the first operation mode.

In the case of inputting the content WC, the controller 180 may cause ink to be ejected from the tip 102. Accordingly, the user may visually confirm the content WC described on the object 300 of the paper material.

Figure 31:
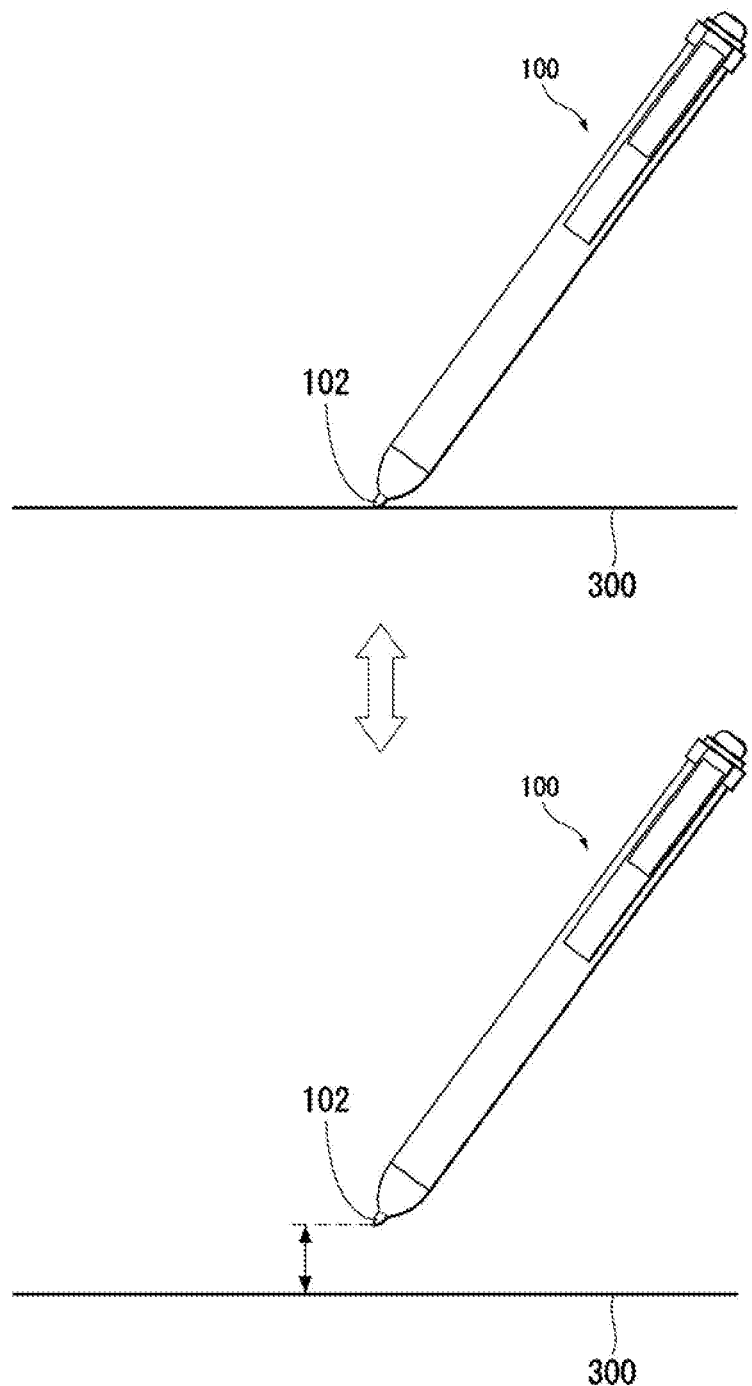

As shown in FIG. 31, the user may switch the operation mode by taking a specific gesture. For example, in a state where the tip 102 is in contact with the object 300, the user may separate the object 300 and the tip 102 a predetermined number of times within a predetermined time. Such an operation may be similar to a gesture that taps the tip 102 on the object 300.

The controller 180 may switch the operation mode of the electronic device 100 when there is a user's specific gesture input. The controller 180 may also switch the operation mode of the electronic device 100 in accordance with the input of the specific characters and symbols and/or the change of the posture of the electronic device 100 described above.

Figure 32:
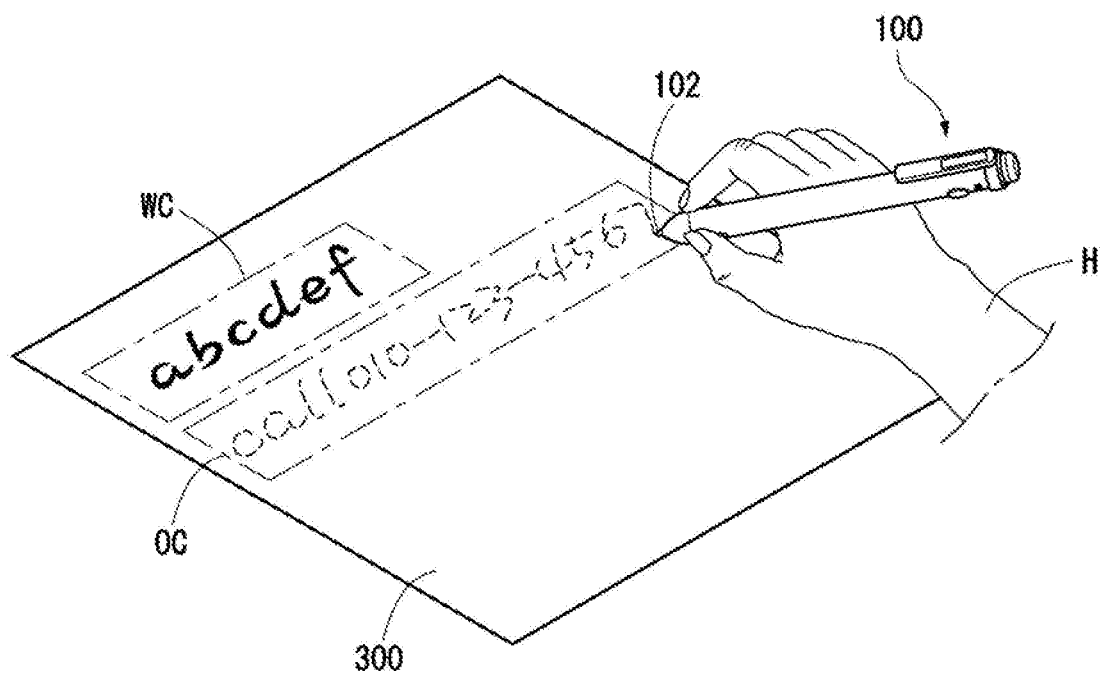

As shown in FIG. 32, when the operation mode is switched, the controller 180 may deactivate the tip 102. For example, the controller may prevent the ink from being ejected from the tip 102. Visually recognizable characters and the like may not be displayed on the object 300 due to the ink not being ejected from the tip 102. Although visually recognizable characters and the like are not displayed, the controller 180 may sense the control command OC inputted by the user through the sensing unit 140.

Figure 33:
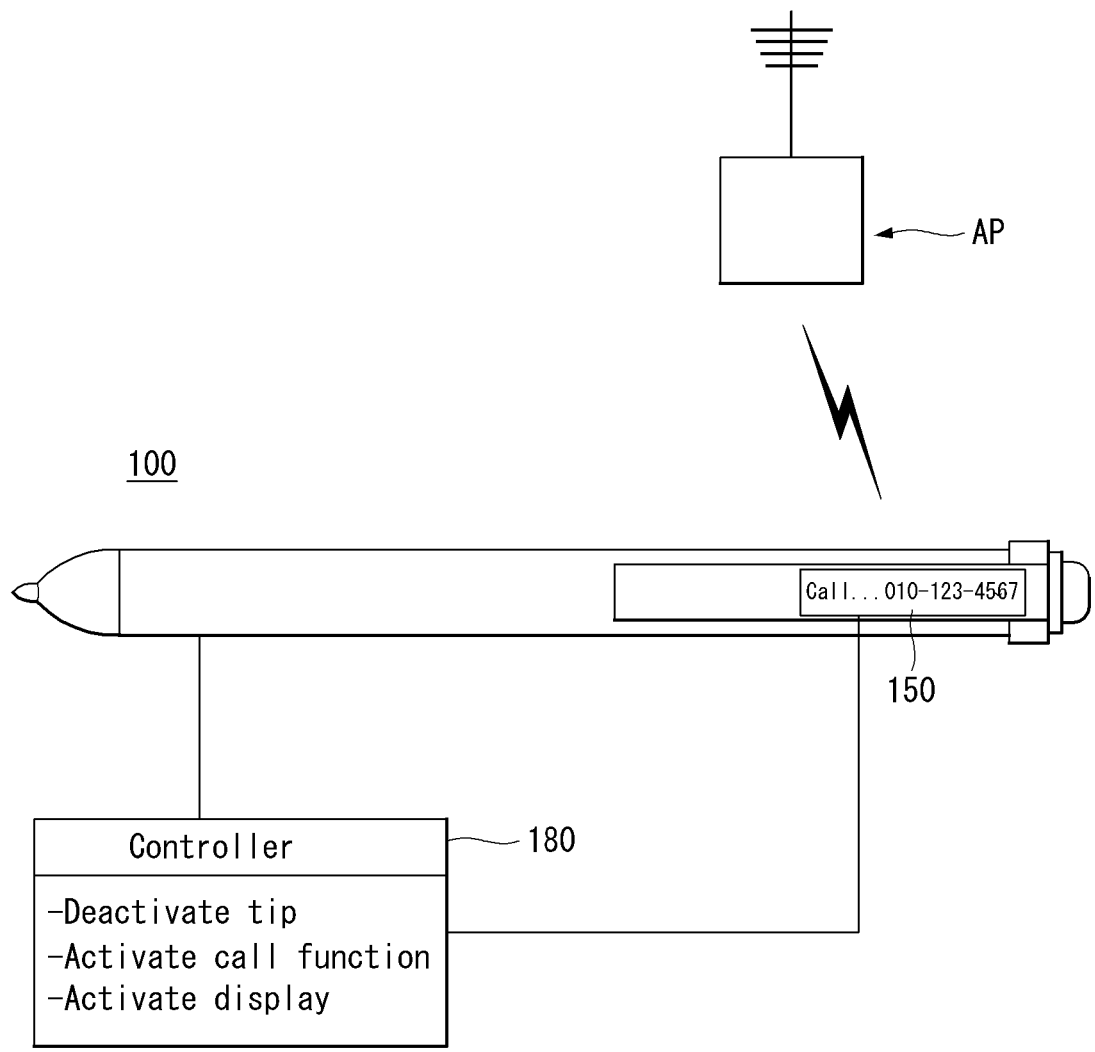

As shown in FIG. 33, the controller 180 may perform a function corresponding to the control command OC inputted when the operation mode is switched into the second mode. For example, the controller 180 may perform at least one of deactivation of the tip 102, activation of the call function, and activation of the display.

Figure 34:
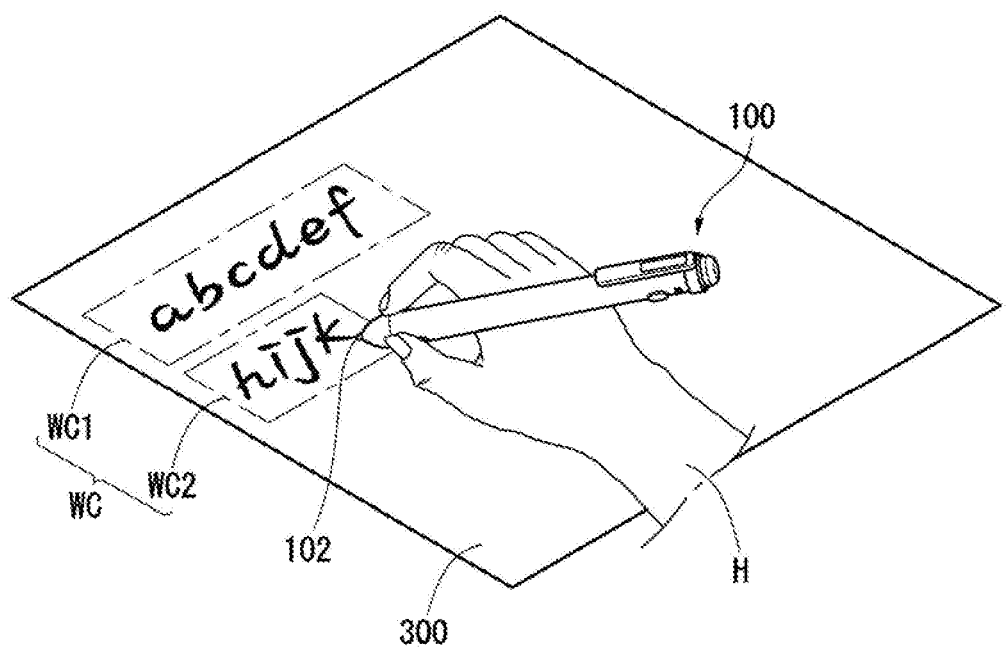

As shown in FIG. 34, as ink injection of the tip 102 is deactivated when the controller is operating in the second mode, there may not be a visually recognizable control command OC on the object 300. Therefore, the user may write the second content WC2 regardless of the control command OC previously input. Therefore, the user may use the object 300 more efficiently.

The above-described present invention can be implemented with computer-readable code in a program recorded medium. The computer-readable medium may include all kinds of recording devices capable of storing data readable by a computer system. Examples of the computer-readable medium may include an HDD (Hard Disk Drive), an SSD (Solid State Drive), an SDD (Silicon Disk Drive), a ROM, a RAM, a CD-ROM, magnetic tapes, floppy disks, optical data storage devices, and the like and also include such a carrier-wave type implementation such as transmission over the Internet. Furthermore, the aforementioned computer may include the controller of the electronic device. Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An electronic device comprising:
a housing including a grip portion for gripping the electronic device to input content;
a memory included in the housing;
a sensor located in the housing and configured to sense a trajectory of a tip of the electronic device; and
a controller configured to:
operate in a first mode in which input content corresponding to the sensed trajectory of the tip of the electronic device is stored in the memory, and
operate in a second mode in which an input command corresponding to the sensed trajectory of the tip of the electronic device executes a specific function on the electronic device,
wherein the controller is further configured to switch from the first mode to the second mode when at least one of a preset specific character and symbol corresponding to the sensed trajectory of the tip of the electronic device is input,
wherein the controller is further configured to activate a first function for performing the specific function and control a display of the electronic device to display information related to the first function when the controller switches from the first mode to the second mode, and
wherein the controller is further configured to switch from the first mode to the second mode when at least one of a preset posture of the electronic device or a gesture is input and is maintained longer than or equal to a preset time.

2. The electronic device according to claim 1, wherein the controller is further configured to activate the specific function corresponding to at least one of the specific character and symbol among a plurality of functions included in a function group.

3. The electronic device according to claim 1, wherein the controller is further configured to execute the specific function using additional information input together with at least one of the preset specific character and symbol.

4. The electronic device according to claim 1, wherein the specific function comprises at least one of call function, message transmission/reception function, contact display function, alarm function, playback function, recording function, and e-mail transmission/reception function.

5. The electronic device according to claim 1, wherein the tip is located at one end of the housing which is a point of contact with another object.

6. The electronic device according to claim 5, wherein the controller is further configured to selectively activate the tip in the first mode.

7. The electronic device according to claim 1, further comprising:
a wireless communication unit configured to transmit the content stored in the memory to at least one other device.

8. A method of controlling an electronic device including a housing a grip portion; a memory included in the housing; a sensor located in the housing; and a controller, the method comprising:
sensing, via the sensor, a trajectory of a tip of the electronic device;
operating, via the controller, in a first mode in which input content corresponding to the sensed trajectory of the tip of the electronic device is stored in the memory;
operating, via the controller, in a second mode in which an input command corresponding to the sensed trajectory of the tip of the electronic device executes a specific function on the electronic device;
switching, via the controller, from the first mode to the second mode when at least one of a preset specific character and symbol corresponding to the sensed trajectory of the tip of the electronic device is input; and
activating, via the controller, a first function for performing the specific function and control a display of the electronic device to display information related to the first function when the controller switches from the first mode to the second mode,
wherein the method further comprises:
switching from the first mode to the second mode when at least one of a preset posture of the electronic device or a gesture is input and is maintained longer than or equal to a preset time.

9. The method according to claim 8, further comprising:
activating the specific function corresponding to at least one of the specific character and symbol among a plurality of functions included in a function group.

10. The method according to claim 8, further comprising:
executing the specific function using additional information input together with at least one of the preset specific character and symbol.

11. The method according to claim 8, wherein the specific function comprises at least one of call function, message transmission/reception function, contact display function, alarm function, playback function, recording function, and e-mail transmission/reception function.

12. The method according to claim 8, wherein the tip is located at one end of the housing which is a point of contact with another object.

\* \* \* \* \*